(12) United States Patent
Wang et al.

(10) Patent No.: US 12,720,247 B2
(45) Date of Patent: Aug. 25, 2026

(54) EARPHONE ASSEMBLY

(71) Applicant: SHENZHEN SHOKZ CO., LTD., Shenzhen (CN)

(72) Inventors: Chong Wang, Shenzhen (CN); Ruixin Han, Shenzhen (CN); Ao Ji, Shenzhen (CN); Jiang Xu, Shenzhen (CN)

(73) Assignee: SHENZHEN SHOKZ CO., LTD., Shenzhen (CL)

( * ) Notice: Subject to any disclaimer, the term of this patent is extended or adjusted under 35 U.S.C. 154(b) by 228 days.

(21) Appl. No.: 18/614,809

(22) Filed: Mar. 25, 2024

(65) Prior Publication Data

US 2024/0236540 A1 Jul. 11, 2024

Related U.S. Application Data

(63) Continuation of application No. PCT/CN2023/078247, filed on Feb. 24, 2023.

(30) Foreign Application Priority Data

Feb. 25, 2022 (CN) ......................... 202210179253.4
Feb. 25, 2022 (CN) ......................... 202220406006.9
(Continued)

(51) Int. Cl.
*H04R 1/1025* (2026.01)
*H02J 7/70* (2026.01)
(Continued)

(52) U.S. Cl.
CPC ............ *H04R 1/1025* (2013.01); *H02J 7/751* (2026.01); *H04R 1/1008* (2013.01); *H04R 1/1041* (2013.01); *H02J 7/82* (2026.01)

(58) Field of Classification Search
CPC ...... H02J 7/0044; H02J 7/0045; H02J 7/0048; H04R 1/1008; H04R 1/1025; H04R 1/1041; H04R 3/00
(Continued)

(56) References Cited

U.S. PATENT DOCUMENTS 9,438,181 B1 * 9/2016 Baker .................. H03F 1/0222
2019/0387304 A1 * 12/2019 Song ...................... G06F 3/165
(Continued)

FOREIGN PATENT DOCUMENTS

CN 1666491 A 9/2005
CN 108092356 A 5/2018
(Continued)

OTHER PUBLICATIONS

European partial Search Report, European Application No. 23759286.0, mailed May 22, 2025 (85 pages).
(Continued)

*Primary Examiner* — Lun-See Lao

(57) ABSTRACT

Disclosed in the present application is an earphone assembly. The earphone assembly comprises earphones and a charging case, wherein the charging case is used for charging the earphones that are placed into the charging case, and is further used for performing into-case detection on the earphones that are placed into the charging case. In the present application, the earphone assembly is configured to comprise the earphones and the charging case, such that the earphones and the charging case are configured to be in a matching manner, and the charging case can charge the earphones that are placed into the charging case, and can also perform into-case detection on the earphones that are placed into the charging case, thereby realizing the functional reuse of the charging case, and thus reducing the production costs.

19 Claims, 13 Drawing Sheets

(30) Foreign Application Priority Data

Feb. 25, 2022 (CN) ......................... 202220406322.6
Feb. 25, 2022 (CN) ......................... 202220406402.1
Aug. 10, 2022 (CN) ......................... 202210959509.3

(51) Int. Cl.
*H02J 7/82* (2026.01)
*H04R 1/10* (2026.01)

(58) Field of Classification Search
USPC .................................. 381/74, 312, 313, 1–3
See application file for complete search history.

(56) References Cited

U.S. PATENT DOCUMENTS

2021/0029440 A1* 1/2021 Fukui .................. H04R 1/1041
2021/0289282 A1* 9/2021 Onizuka .............. H04R 1/1016
2021/0320515 A1* 10/2021 Yu ......................... H02J 7/0013
2021/0368256 A1 11/2021 Liu et al.
2022/0124424 A1* 4/2022 Feng ..................... H02J 7/0044
2022/0393495 A1* 12/2022 Liao ...................... H02J 7/0047

FOREIGN PATENT DOCUMENTS

CN 108777828 A 11/2018
CN 109660898 A 4/2019
CN 208971765 U 6/2019
CN 110430504 A 11/2019
CN 110536209 A 12/2019
CN 111800697 A 10/2020
CN 112399295 A 2/2021
CN 212486762 U 2/2021
CN 213028507 U 4/2021
CN 112865249 A 5/2021
CN 112866861 A 5/2021
CN 213368071 U 6/2021
CN 214101714 U 8/2021
CN 214590667 U 11/2021
CN 113873383 A 12/2021
CN 216852306 U 6/2022
CN 217363275 U 9/2022
CN 217935888 U 11/2022
WO 2022022618 A1 2/2022

OTHER PUBLICATIONS

European Search Report, European Application No. 23759286.0, mailed Aug. 12, 2025 (11 pages).
Chinese First Office Action, Chinese Application No. 202220406006.9, mailed Jun. 1, 2022 (3 pages).
Chinese First Office Action, Chinese Application No. 202220406402.1, mailed Jun. 1, 2022 (5 pages).
Chinese Notification to Grant Patent Right for Invention, Chinese Application No. 202220406402.1, mailed Sep. 14, 2022 (3 pages).
Chinese Notification to Grant Patent Right for Invention, Chinese Application No. 202220406322.6, mailed Aug. 19, 2022 (3 pages).
Chinese Notification to Grant Patent Right for Invention, Chinese Application No. 202220957714.1, mailed Sep. 15, 2022 (3 pages).
International Search Report, International Application No. PCT/CN2023/078247, mailed Jun. 10, 2023 (15 pages).
Chinese First Office Action, Chinese Application No. 202210959509.3, mailed Nov. 27, 2025 (18 pages).

* cited by examiner 2129B
212
2128
213
21241
2129A

EARPHONE ASSEMBLY

CROSS REFERENCE TO RELATED APPLICATION

The present application is a continuation application of the international patent application No. PCT/CN2023/078247, filed on Feb. 24, 2023, which claims priority of Chinese patent application No. 202210179253.4, filed on Feb. 25, 2022, in the title of "EARPHONE ASSEMBLY"; Chinese patent application No. 202220406402.1, filed on Feb. 25, 2022, in the title of "EARPHONE ASSEMBLY"; Chinese patent application No. 202220406322.6, filed on Feb. 25, 2022, in the title of "EARPHONE ASSEMBLY"; Chinese patent application No. 202220406006.9, filed on Feb. 25, 2022, in the title of "EARPHONE ASSEMBLY"; Chinese patent application No. 202210959509.3, filed on Aug. 10, 2022, in the title of "EARPHONE ASSEMBLY"; and contents of which are incorporated herein by their entireties.

TECHNICAL FIELD

The present disclosure relates to the field of sound playing devices, and in particular to an earphone assembly.

BACKGROUND

Earphones have been widely used in people's daily life and can be used in combination with mobile phones, computers, and other electronic devices to provide premium auditory enjoyment for a user. Generally, the earphones are equipped with a charging case that match with the earphones, and the charging case is configured to charge the earphones.

SUMMARY OF THE INVENTION

The present disclosure provides an earphone assembly, including earphones and a charging case. The charging case is configured to charge the earphones received in the charging case and is further configured to detect the in-case state of the earphones that are received in the charging case.

BRIEF DESCRIPTION OF THE DRAWINGS

In order to more clearly illustrate the technical solutions in the embodiments of the present disclosure, the accompanying drawings for describing the embodiments will be introduced briefly in the following. Apparently, the following description of the accompanying drawings shows only some of the embodiments of the present disclosure. Any ordinary skilled person in the art may obtain other accompanying drawings based on the following accompanying drawings without any creative work.

DETAILED DESCRIPTION

In order to enable any ordinary skilled person in the art to better understand the technical solutions of the present disclosure, the earphone assembly provided in the present disclosure will be described in further detail hereinafter by referring to the accompanying drawings and embodiments. It should be understood that the described embodiments are some but not all of the embodiments of the present disclosure. All other embodiments, which are obtained by any ordinary skilled person in the art based on the embodiments in the present disclosure without making any creative work, shall fall within the scope of the present disclosure.

The terms "first", "second" and the like are used to distinguish various elements, but not to describe a certain sequence. The terms "includes", "have", and any variations thereof, are intended to cover non-exclusive inclusion. For example, a process, a method, a system, a product or an apparatus including a series of operations or units is not limited to the listed operations or units, but optionally includes operations or units that are not listed or other operations or units that are inherently included in the process, the method, the system, the product or the apparatus.

Figure 1:
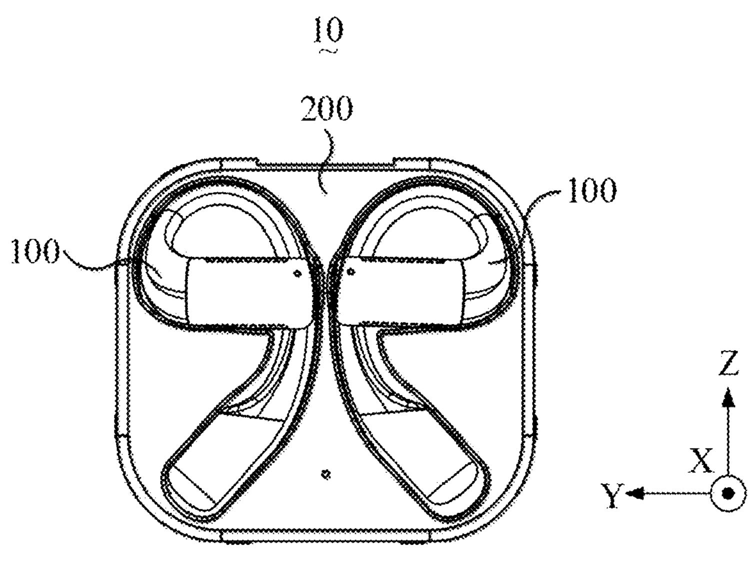
FIG. 1 is a structural schematic view of an earphone assembly according to an embodiment of the present disclosure.

The present disclosure provides an earphone assembly. As shown in FIG. 1, FIG. 1 is a structural schematic view of an earphone assembly according to an embodiment of the present disclosure. The earphone assembly 10 includes earphones 100 and a charging case 200. Specifically, when the charging case 200 is opened, the earphones 100 are received in the charging case 200, such that the charging case 200 charges the earphones 100.

The number of the earphones 100 is two, respectively corresponding to a left ear and a right ear of a user. When either one of the two headphones 100 is received in the charging case 200, and when the charging case 200 detects that a battery power level of the received headphone 100 is less than a predetermined threshold, the charging case 200 charges the earphone 100 until the battery power level of the earphone 100 reaches a 100% power level. In some embodiments, the predetermined threshold is a 90% power level.

In addition, when the two earphones 100 are both received in the charging case 200, the charging case 200 performs a charging operation on the two earphones 100 only when the charging case 200 detects that the battery power level of each of the two earphones 100 is less than the predetermined threshold.

Figure 2:
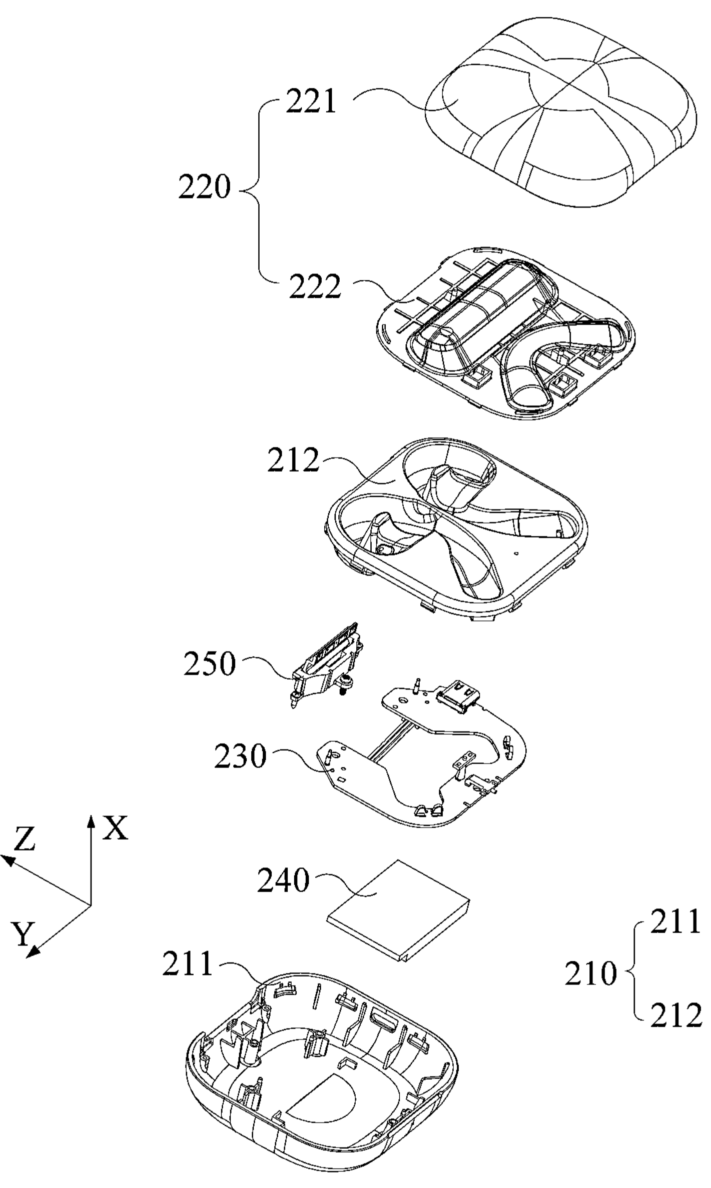
FIG. 2 is a structural schematic view of a charging case shown in FIG. 1, according to an embodiment of the present disclosure.

As shown in FIG. 1 and FIG. 2, FIG. 2 is a structural schematic view of the charging case shown in FIG. 1, according to an embodiment of the present disclosure. As shown in FIG. 2, the charging case 200 includes a first housing assembly 210, a second housing assembly 220, a circuit board 230, a battery 240, and an adapter assembly 250. The first housing assembly 210 is pivotally connected to the second housing assembly 220.

Specifically, the first housing assembly 210 includes a case body 211 and a support plate 212. An end of the case body 211 has an opening, and the support plate 212 is disposed at the end of the case body 211 having the opening. A receiving space 214 is defined between the case body 211 and the support plate 212. The circuit board 230, the battery 240, and the adapter assembly 250 are received in the receiving space 214.

Figure 5:
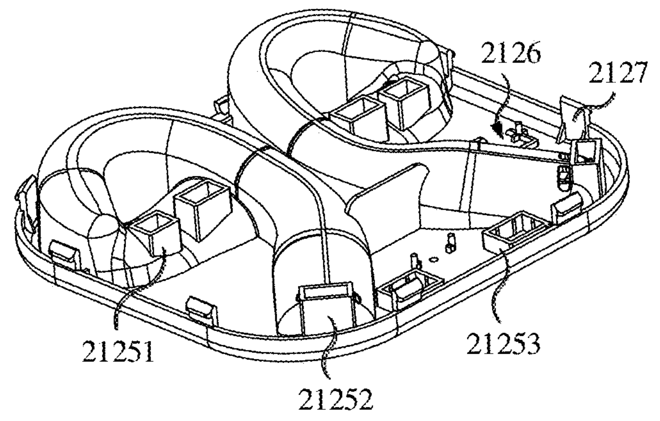
FIG. 5 is a third structural schematic view of the support plate shown in FIG. 2, according to an embodiment of the present disclosure.
Figure 6:
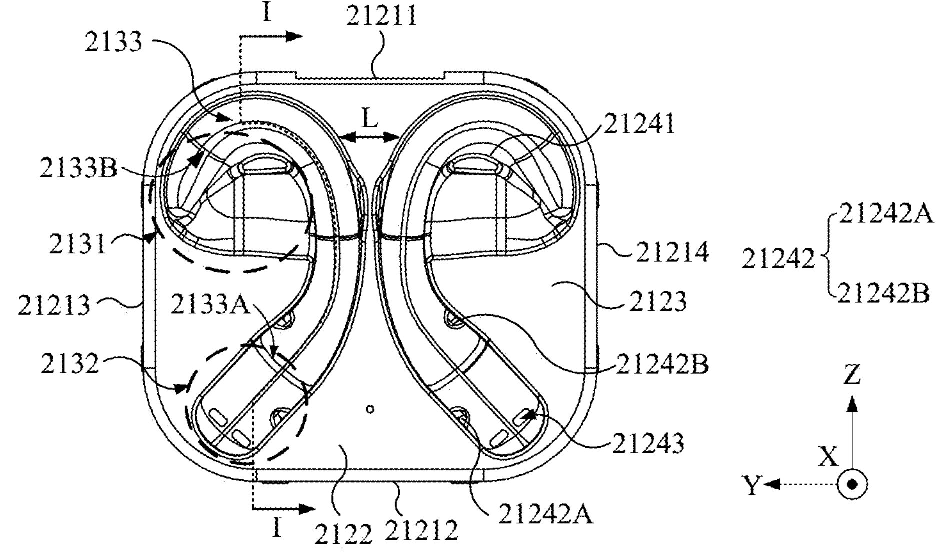
FIG. 6 is a front view of the support plate shown in FIG. 2, according to an embodiment of the present disclosure.
Figure 7:
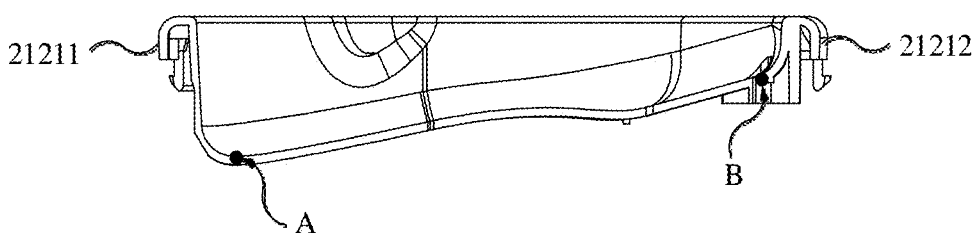
FIG. 7 is a cross-sectional view of the support plate shown in FIG. 6, taken along a line I-I.
Figure 8:
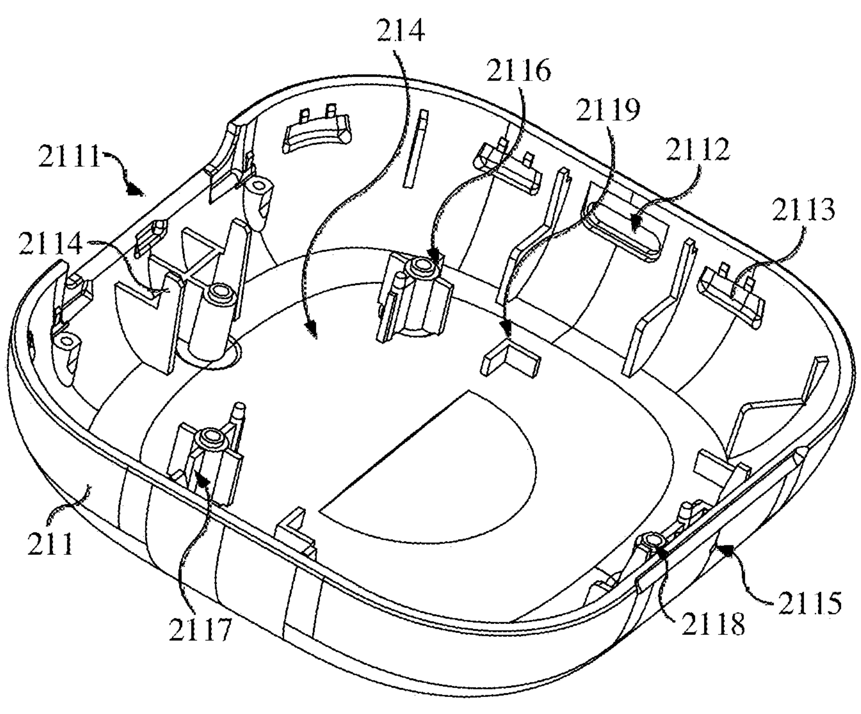
FIG. 8 is a structural schematic view of a case body shown in FIG. 2, according to an embodiment of the present disclosure.

As shown in FIG. 2, FIGS. 3, and 5-FIG. 8, FIG. 3 is a first structural schematic view of the support plate shown in FIG. 2, according to an embodiment of the present disclosure; FIG. 5 is a third structural schematic view of the support plate shown in FIG. 2, according to an embodiment of the present disclosure; FIG. 6 is a front view of the support plate shown in FIG. 2, according to an embodiment of the present disclosure; FIG. 7 is a cross-sectional view of the support plate shown in FIG. 6, taken along a line I-I; and FIG. 8 is a structural schematic view of the case body shown in FIG. 2, according to an embodiment of the present disclosure.

Figure 3:
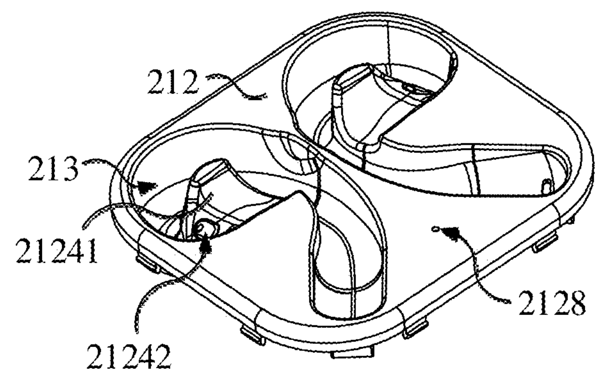
FIG. 3 is a first structural schematic view of a support plate shown in FIG. 2, according to an embodiment of the present disclosure.

As shown in FIG. 3 and FIG. 6, the support plate 212 defines a shape-matching groove 213 for receiving the earphones 100 and having a shape following a shape of the earphones 100. Specifically, the support plate 212 has a first side edge 21211, a second side edge 21212 opposite to the first side edge 21211, a third side edge 21213, and a fourth side edge 21214 opposite to the third side edge 21213. The third side edge 21213 and the fourth side edge 21214 connect the first side edge 21211 to the second side edge 21212. The shape-matching 213 includes a first shape-matching region 2131, a second shape-matching region 2132, and a third shape-matching region 2133. The third shape-matching region 2133 is configured to connect the first shape-matching region 2131 to the second shape-matching region 2132. The first shape-matching region 2131 is located near the first side edge 21211, and the second shape-matching region 2132 is located near the second side edge 21212.

The third shape-matching region 2133 includes a first boundary 2133A and a second boundary 2133B, respectively formed at two ends of an arc section. The third shape-matching region 2133 is connected to the second shape-matching region 2132 through the first boundary 2133A. The third shape-matching region 2133 is connected to the first shape-matching region 2131 through the second boundary 2133B.

Figure 20:
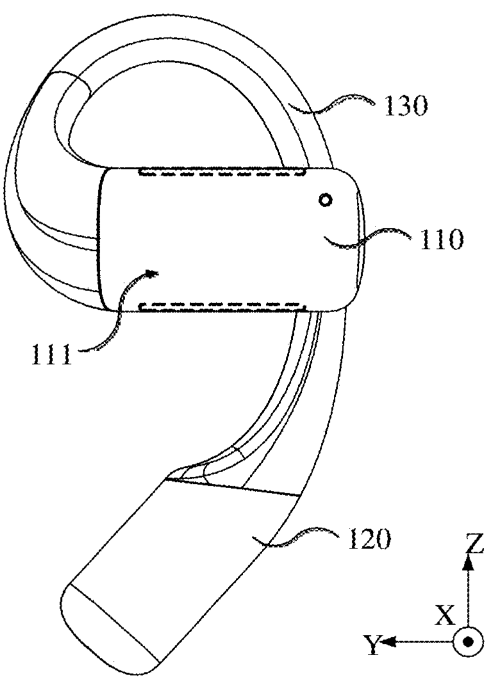
FIG. 20 is a first structural schematic view of the earphones shown in FIG. 1, according to an embodiment of the present disclosure.
Figure 22:
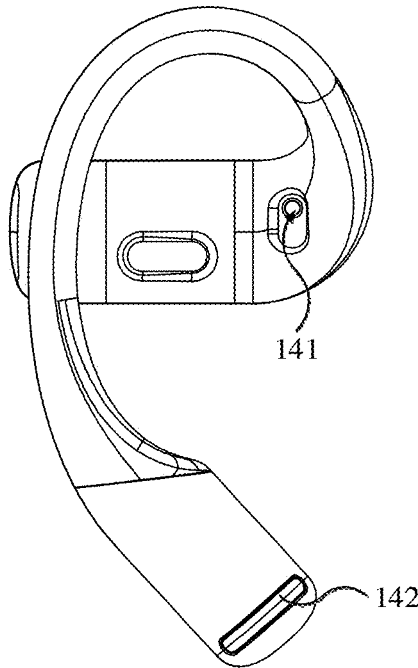
FIG. 22 is a third structural schematic view of the earphones shown in FIG. 1, according to an embodiment of the present disclosure.

Further, as shown in FIG. 20 and FIG. 22, FIG. 20 is a first structural schematic view of the earphones shown in FIG. 1, according to an embodiment of the present disclosure, and FIG. 22 is a third structural schematic view of the earphones shown in FIG. 1, according to an embodiment of the present disclosure. As shown in FIG. 20, for each of the two earphones, the earphone 100 includes a body portion 110, a battery portion 120, and an elastic connection portion 130. The elastic connection portion 130 is configured to connect the body portion 110 to the battery portion 120. As shown in FIG. 22, when the earphone 100 is being worn to an ear of a user, a side of the body portion 110 near the ear is arranged with a first power-receiving electrode 141, and a side of the battery portion 120 near the ear is arranged with a second power-receiving electrode 142.

In each of the two earphones, the elastic connection portion 130 connects the body portion 110 to the battery portion 120 to enable the earphone 100 to be curved in a three-dimensional space when the earphone 100 is in a not worn to the ear (i.e., in a natural state). That is, in the three-dimensional space, the body portion 110, the battery portion 120, and the elastic connection portion 130 are not coplanar. When the earphone 100 is worn to the ear, the body portion 110 is configured to contact a front side of the ear of the user, the battery portion 120 and a part of the elastic connecting portion 130 are configured to be located between a rear side of the ear and the head of the user. The part of the elastic connection portion 130 extends from the head toward an outside of the head and cooperates with the body portion 110 to provide a compression force to the front side of the ear. In this way, the body portion 110, the elastic connection portion 130, and the battery portion 120 cooperatively clamp the ear.

Specifically, a ratio of a length of the elastic connection portion 130 in a third direction Z to a length of the battery portion 120 in the third direction Z is greater than or equal to 100%. In some embodiments, the ratio is greater than or equal to 150%. A projection of the battery portion 120 to an X-Y plane is located within a projection of the elastic connection portion 130 to the X-Y plane. A cross-sectional area of at least a partial region of the battery portion 120 is greater than a maximum cross-sectional area of the elastic connection portion 130. In the present embodiment, the battery portion 120 columnar, and a ratio of the length of the battery portion 120 to an outer diameter of the battery portion 120 is less than or equal to 6.

The first shape-matching region 2131 is defined to receive the body portion 110 of the earphone 100. The second shape-matching region 2132 is defined to receive the battery portion 120 of the earphone 100. The third shape-matching region 2133 is defined to receive the elastic connection portion 130 of the earphone 100. Specifically, as shown in FIG. 1, the earphone 100 is received inside the charging case 200 along a direction opposite to a first direction X, and the side of the earphone 100 arranged with the first power-receiving electrode 141 and the second power-receiving electrode 142 is located near the shape-matching groove 213.

As shown in FIGS. 5 and 7, a depth of a portion of the shape-matching groove 213 near the first side edge 21211 is greater than a depth of another portion of the shape-matching groove 213 near the second side edge 21212. A depth of a portion of the first shape-matching region 2131 is less than a depth of the second shape-matching region 2132. A depth of a portion of the third shape-matching region 2133 near the first side edge 21211 is greater than the depth of the second shape-matching region 2132 and is greater than the depth of the first shape-matching region 2131.

The third shape-matching region 2133 has a lowest point A relative to a side of the support plate 212 defining the shape-matching groove 213. The second shape-matching region 2132 has a highest point B relative to the side of the support plate 212 defining the shape-matching groove 213. The side of the support plate 212 defining the shape-matching groove 213 is located on a plane. An angle between the plane and a line connected between the lowest point A and the highest point B is in a range of 10° to 60°. Specifically, the highest point B is a point at which the second power-receiving electrode 142 of the earphone 100 is connected to the second shape-matching region 2132.

When the user is wearing the earphones 100 for a long period of time, sweat of the user may be left on the earphones 100. For the charging case 200 of the present disclosure, the depth of the second shape-matching region 2132 for receiving the battery portion 120 is less than the depth of the third shape-matching region 2133 of the elastic connection portion 130 for receiving the earphones 100. The depth of the first shape-matching region 2131 corresponding to the power-receiving electrode 141 is less than the depth of the lowest point A. In this way, the left sweat flows along the shape-matching groove 213 to reach the lowest point A, and the sweat is prevented from contacting the first power-receiving electrode 141 on the body portion 110 and the second power-receiving electrode 142 on the battery portion 120, and a short circuit can be prevented.

As shown in FIG. 20, the body portion 110 of the earphone 100 includes a housing 111, a core (not shown), and a main board (not shown). The housing 111 defines a receiving cavity (not shown). The core and the main board are received in the receiving cavity. The main board is further arranged with a second microprocessor 112.

Specifically, a key (not shown) is arranged on a side of the housing 111 away from the elastic connection portion 130. The key is connected to the second microprocessor 112, and specifically, the keypad is electrically connected to the second microprocessor 112. In some embodiments, the key may be a physical key or a touch-screen key, and so on. Specifically, the key may be an interaction assembly, such as a physical key, a display, a touch circuit board, and so on.

The key generates a key trigger signal in response to detecting a signal input by the user. The second microprocessor 112 receives the generated key trigger signal. The second microprocessor 112 is configured to detect whether an in-case state signal, which indicates the earphone 100 being received in the charging case, is received and is configured to perform a corresponding function based on the key trigger signal and the in-case state signal.

When the second microprocessor 112 detects the in-case state signal, the second microprocessor 112 determines that the earphone 100 is received in the charging case 200. In this case, when the second microprocessor 112 receives the key trigger signal generated by the key, the second microprocessor 112 controls the earphone 100 to perform a first function. When the second microprocessor 112 does not detect the in-case state signal, the second microprocessor 112 determines that the earphone 100 is not received in the charging case 200. In this case, when the second microprocessor 112 receives the key trigger signal generated by the key, the second microprocessor 112 controls the earphone 100 to perform a second function.

In some embodiments, the first function includes at least one of: pairing of the earphone 100 with a communication device; and restoring the earphone 100 to default settings. The second function includes at least one of: the earphone 100 playing or stopping playing an audio; fast forwarding or rewinding the audio; and switching songs.

In the present embodiment, the key of the earphone 100 has multiplex functions, such that the earphone 100, when being placed out of and inside the charging case 200, achieves different functions by one key. In this way, the number of keys is reduced, a manufacturing cost is reduced, and a structure of the earphone is simplified.

As shown in FIGS. 3, 5, and 6, the number of shape-matching grooves 213 is two for receiving the two earphones 100 respectively. The two shape-matching grooves 213 are configured in mirror to each other, such that the two earphones 100 received in the two shape-matching grooves 213 are also configured in mirror to each other. In this way, the earphone 100 that is worn to the left ear of the user is received in a left shape-matching groove 213, and the earphone 100 that is worn to the right ear of the user is received in a right shape-matching groove 213, which conforms to a habit of the user taking the earphones. The user may take the two earphones 100 conveniently, and the two earphones 100 can be firmly placed in the charging case 200.

A spacing L is defined between the third shape-matching region 2133 of one of the two shape-matching grooves 213 and the third shape-matching region 2133 of the other one of the two shape-matching grooves 213. The spacing L is firstly gradually decreased and then gradually increased in a direction extending from the first side edge 21211 to the second side edge 21212. Specifically, the spacing L is a spacing between a side wall of one third shape-matching region 2133 adjacent to the other third shape-matching region 2133 and a side wall of the other third shape-matching region 2133 adjacent to the instant one third shape-matching region 2133.

As shown in FIG. 5, a side of the support plate 212 away from the shape-matching groove 213 is further arranged with two sets of magnet mounting slots 21251 and 21252 for receiving first magnets (not shown). The elastic connection portion 130 of the earphone 100 may be deformed easily after being worn for a long period of time. When the earphone 100 is received in the shape-matching groove 213, second magnets, which are arranged inside the earphone 100, attract the first magnets to allow the earphone 100 to be arranged to follow the shape of the shape-matching groove 213, and the earphone 100 is prevented from falling out of the shape-matching groove 213 accidentally.

Each set of magnet mounting slots 21251 has one or more slots. A plurality of magnets received in the two sets of magnet mounting slots 21251 form a set of first magnets. In this way, an attraction force of the first magnets applied to the second magnets is increased to enable the body portion 110, which has a large weight, to be fixed in a position, and a possibility of the earphone 100 wobbling within the shape-matching groove 213 is reduced. Each set of magnet mounting slots 21252 has one or more slots. A plurality of magnets received in the two sets of magnet mounting slots 21252 form another set of first magnets. That is, two sets of first magnets are respectively received in the magnet mounting slots 21251 and the magnet mounting slots 21252, and that is, the two sets of first magnets are disposed on a side of the support plate 212 near the circuit board 230. Projections of one set of the two sets of first magnets along the first direction X onto the circuit board 230 are located within a projection of the first shape-matching region 2131 along the first direction X onto the circuit board 230; and projections of the other one set of the two sets of first magnets along the first direction X onto the circuit board 230 are located within a projection of the second shape-matching region 2132 along the first direction X onto the circuit board 230.

Further, the side of the support plate 212 away from the shape-matching groove 213 is further arranged with a fastener 2127. As shown in FIG. 8, an inner wall of the case body 211 defines a slot 2113. The fastener 2127 is snapped with the slot 2113 to connect the case body 211 with the support plate 212 to form the first housing assembly 210. In some embodiments, a blind hole and a blind pillar, or magnets may be arranged to achieve the snapping.

As shown in FIG. 6, the support plate 212 includes a first flat region 2122 and two second flat regions 2123. The first flat region 2122 is disposed between the two third shape-matching regions 2133 of the two shape-matching grooves 213 and is near the second side edge 21212. The two second flat regions 2123 are disposed on two sides of the two third shape-matching regions 2133 of the two shape-matching grooves 213. One of the two second flat regions 2123 is near the third side edge 21213, and the other one of the two second flat regions 2123 is near the fourth side edge 21214.

When the circuit board 230 is received in the receiving space 214 of the first housing assembly 210, a projection of the circuit board 230 along the first direction X onto a bottom wall of the case body 211 is near a projection of the second side edge 21212 of the support plate 212 along the first direction X onto the bottom wall of the case body 211. Specifically, the projection of the circuit board 230 onto the bottom wall of the case body 211 along the first direction X coincides with a projection of the first flat region 2122 onto the bottom wall of the case body 211 along the first direction X. The projection of the circuit board 230 onto the bottom wall of the case body 211 along the first direction X further coincides with a projection of at least one of the two second flat regions 2123 onto the bottom wall of the case body 211 along the first direction X.

Figure 9:
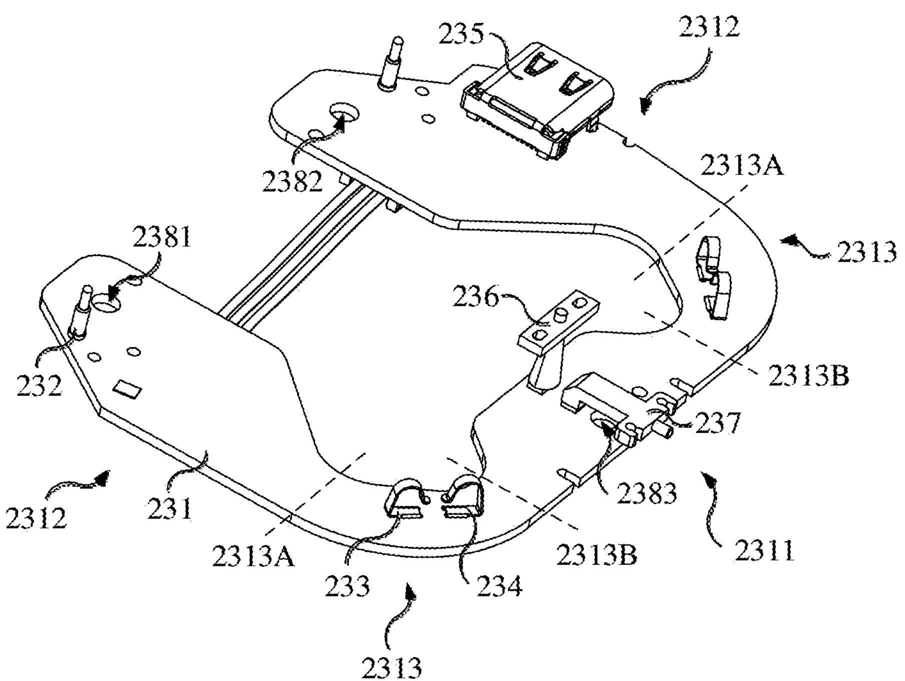
FIG. 9 is a first structural schematic view of a circuit board shown in FIG. 2, according to an embodiment of the present disclosure.
Figure 11:
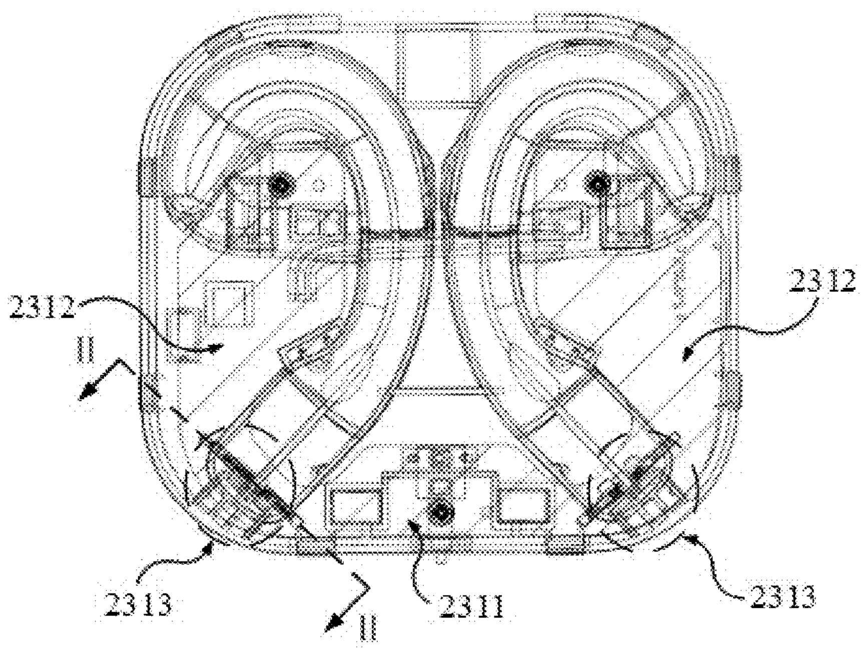
FIG. 11 is a structural schematic view of the support plate shown in FIG. 2 being assembled with the circuit board shown in FIG. 2, according to an embodiment of the present disclosure.

As shown in FIG. 6, FIG. 22, FIG. 9 and FIG. 11, FIG. 9 is a first structural schematic view of the circuit board shown in FIG. 2, according to an embodiment of the present disclosure; and FIG. 11 is a structural schematic view of the support plate shown in FIG. 2 being assembled with the circuit board shown in FIG. 2, according to an embodiment of the present disclosure. As shown in FIG. 9, a side of the circuit board 230 near the support plate 212 is arranged with a second power supply electrode 232, a first power supply electrode 233, and a detection electrode 234. As shown in FIGS. 9 and 11, the circuit board 230 includes a first circuit region 2311, a second circuit region 2312, and a connection region 2313.

The connection region 2313 is substantially ring-shaped. The connection region 2313 corresponds to an arc transition portion disposed between the second side edge 21212 and the third side edge 21213 of the support plate 212 or corresponds to an arc transition portion disposed between the second side edge 21212 and the fourth side edge 21214 of the support plate 212. The two ends of the connection region 2313 are connected to the first circuit region 2311 and the second circuit region 2312, respectively. The second power supply electrode 232 is arranged in the second circuit region 2312. The first power supply electrode 233 and the detection electrode 234 are arranged in the connection region 2313.

Specifically, the connection region 2313 includes a first boundary 2313A and a second boundary 2313B. The first boundary 2313A is parallel to the first side edge 21211 and the second side edge 21212. The second boundary 2313B is parallel to the third side edge 21213 and the fourth side edge 21214. The connection region 2313 is connected to the second circuit region 2312 via the first boundary 2313A and is connected to the first circuit region 2311 through the second boundary 2313B.

Two sets of the second circuit regions 2312 and the connection regions 2313 are arranged. In a direction of a spacing between the third side edge 21213 and the fourth side edge 21214, one set of the two sets of the second circuit regions 2312 and the connection regions 2313 is connected to one of two ends of the first circuit region 2311; and the other one set of the two sets of the second circuit regions 2312 and the connection regions 2313 is connected to the other one of the two ends of the first circuit region 2311. In this way, the circuit board 230 is U-shaped in overall. The circuit board 230 is symmetrical about a centerline of the first circuit region 2311. Two second power supply electrodes 232, which are respectively disposed in the two sets of second circuit regions 2312; two first power supply electrodes 233, which are respectively disposed in the two sets of connection regions 2313; and two detection electrodes 234, which are respectively disposed in the two sets of connection regions 2313, are symmetrically disposed about the centerline of the first circuit region 2311.

Specifically, a projection of the first circuit region 2311 onto the bottom wall of the case body 211 along the first direction X coincides with a projection of the first flat region 2122 onto the bottom wall of the case body 211 along the first direction X.

A projection of the second circuit region 2312 onto the bottom wall of the case body 211 along the first direction X coincides with a projection of the second flat region 2123 onto the bottom wall of the case body 211 along the first direction X. The projection of the second circuit region 2312 onto the bottom wall of the case body 211 further coincides with the projection of the first shape-matching region 2131 onto the bottom wall of the case body 211.

The connection region 2313 connects the first circuit region 2311 to the second circuit region 2312. A projection of the connection region 2313 onto the bottom wall of the case body 211 along the first direction X coincides with a projection of the second shape-matching region 2132 onto the bottom wall of the case body 211 along the first direction X.

An overlapping area between the connection region 2313 and the second shape-matching region 2132 is smaller than an overlapping area between the first circuit region 2311 and the first flat region 2122 and smaller than an overlapping area between the second circuit region 2312 and the second flat region 2123. A majority of the circuit board 230 is disposed at a location that does not overlap with the shape-matching groove 213, and the circuit board 230 does not overlap with the third shape-matching region 2133. That is, in a horizontal plane, the circuit board 230 does not overlap with a deepest position of the shape-matching groove 213. In this way, a height of the circuit board 230 and the shape-matching groove 213 in a thickness direction of the charging case 200 is reduced, a size of the charging case 200 is reduced, the charging case 200 is more portable, and a production cost of the charging case 200 is reduced.

In some embodiments, an overlapping area between the projection of the circuit board 230 onto the bottom wall of the case body 211 and the projection of the third shape-matching region 2133 onto the bottom wall of the case body 211 is less than 5% of the total area of the projection of the circuit board 230 onto the bottom wall of the case body 211. The overlapping area may be 5%, 4%, 3%, 2%, 1%, or 0%, and 0% of the total area of the projection of the circuit board 230. When the overlapping area is 0% of the total area of the projection of the circuit board 230, it indicates that the projection of the circuit board 230 onto the bottom wall of the case body 211 does not overlap with the projection of the third shape-matching region 2133 onto the bottom wall of the case body 211 at all.

As shown in FIGS. 3 and 6, the first shape-matching region 2131 includes a tab 21241 and a charging port 21242 arranged on a side of the tab 21241, and the second power supply electrode 232 is exposed from the charging port 21242. The second shape-matching region 2132 defines a through hole 21243, and the first power supply electrode 233 and the detection electrode 234 are exposed from the through hole 21243.

Figure 16:
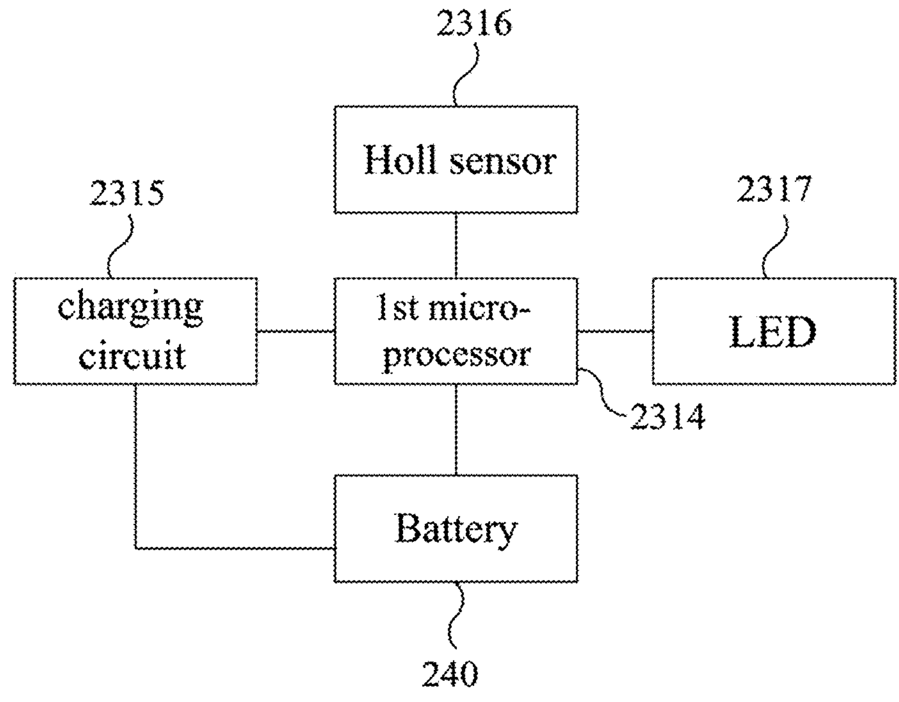
FIG. 16 is a first circuit diagram of the charging case according to an embodiment of the present disclosure.

Further, as shown in FIG. 16, FIG. 16 is a first circuit diagram of the charging case according to an embodiment of the present disclosure. As shown in FIG. 16, the charging case 200 includes a first microprocessor 2314 and a charging circuit 2315 arranged on the circuit board 230. The first microprocessor 2314 is connected to the charging circuit 2315 and the battery 240. The charging circuit 2315 is further connected to the second power supply electrode 232 and the first power supply electrode 233.

Specifically, the second power supply electrode 232 is a Pogo-pin. Each of the first power supply electrode 233 and the detection electrode 234 is a resilient electrode. The detection electrode 234 and the first power supply electrode 233 are disposed opposite to each other in a V-shape. Specifically, a surface of the detection electrode 234 opposite to the first power supply electrode 233 and a surface of the first power supply electrode 233 opposite to the detection electrode 234 form a substantially V-shaped structure. In the present embodiment, the second power supply electrode 232 serves as a charging positive electrode, and the first power supply electrode 233 serves as a charging negative electrode.

Specifically, when the earphone 100 is received in the shape-matching groove 213, the first power-receiving electrode 141 abuts against the second power supply electrode 232, and the second power-receiving electrode 142 abuts against both the first power supply electrode 233 and the detection electrode 234. In this way, the charging circuit 2315 charges the earphone 100 received in the charging case 200 through a charging circuit formed by the second power supply electrode 232 and the first power supply electrode 233.

Figure 23:
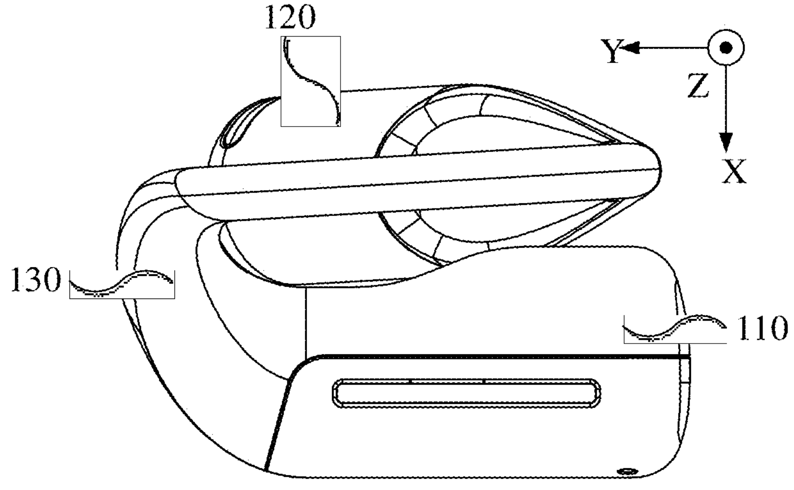
FIG. 23 is a fourth structural schematic view of the earphones shown in FIG. 1, according to an embodiment of the present disclosure.

Further, as shown in FIG. 23, FIG. 23 is a fourth structural schematic view of the earphones shown in FIG. 1, according to an embodiment of the present disclosure. As shown in FIG. 23, the body portion 110 and the battery portion 120 of the earphone 100 are not located in a same horizontal plane. When the earphone 100 is received in the shape-matching groove 213, the body portion 110 and a portion of the elastic connection portion 130 connected to the body portion 110 surrounds the tab 21241, enabling the earphone 100 to fit into the shape-matching groove 213, enabling the first power-receiving electrode 141 to abut against the second power supply electrode 232 more easily.

In the present embodiment, the second power-receiving electrode 142 may be a strip-shaped electrode or a ring-shaped electrode. In this way, when the earphone 100 is received in the shape-matching groove 213, and the second power-receiving electrode 142 fully abuts against the first power supply electrode 233 and the detection electrode 234. In addition, the detection electrode 234 and the first power supply electrode 233, which are disposed opposite each other to form the V shape, may better support and fix the battery portion 120 of the earphone 100. In this way, the second power-receiving electrode 142 is prevented from being electrically disconnected from, caused by a movement of the earphone 100, the first power supply electrode 233 and/or the detection electrode 234.

Figure 17:
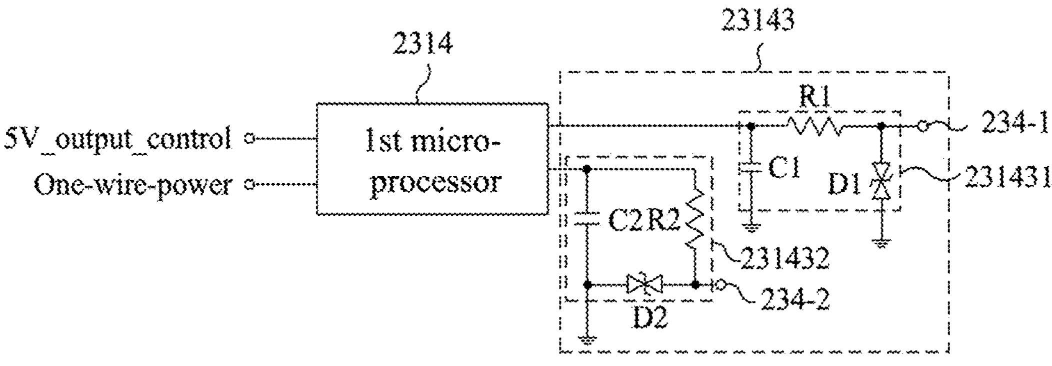
FIG. 17 is a second circuit diagram of the charging case according to an embodiment of the present disclosure.

Specifically, before the charging circuit 2315 charges the earphone 100 received in the charging case 200, it is to be determined whether the earphone 100 is received in the charging case 200. Further, as shown in FIG. 17, FIG. 17 is a second circuit diagram of the charging case according to an embodiment of the present disclosure. As shown in FIG. 17 the charging case 200 further includes a detection circuit 23143. The detection circuit 23143 is connected to the first microprocessor 2314 and a connection end of the detection electrode 234.

When the earphone 100 is received in the charging case 200, the second power-receiving electrode 142 simultaneously abuts against the first power supply electrode 233 and the detection electrode 234 to allow the detection electrode 234 to be short-circuited to the first power supply electrode 233. In addition, the first power supply electrode 233 is the charging negative electrode, and therefore, a voltage level of the detection electrode 234 is pulled down, such that a change in the voltage level is generated. When the earphone 100 is not received in the charging case 200, the voltage level of the detection electrode 234 is not changed.

The detection circuit 23143 detects the change in the voltage level of the detection electrode 234 to generate a detection signal corresponding to the in-case state of the earphone 100 and transmits the corresponding detection signal to the first microprocessor 2314 to inform the first microprocessor 2314 of the in-case state of the earphone 100.

As shown in FIG. 17, the detection circuit 23143 includes a first detection sub-circuit 231431 and a second detection sub-circuit 231432. The first detection sub-circuit 231431 is configured to detect the in-case state of one of the two earphones 100, and the first detection sub-circuit 231432 is configured to detect the in-case state of the other one of the two earphones 100. Two sets of detection electrodes 234 and first power supply electrodes 233 are arranged. When the two earphones 100 are received in the charging case 200, the second power-receiving electrode 142 of either earphone 100 abuts against one set of the detection electrode 234 and the first power supply electrode 233; and the second power-receiving electrode 142 of the other one of the two earphones abuts against the other set of the detection electrode 234 and the first power supply electrode 233. Specifically, the first detection sub-circuit 231431 detects the change in the voltage level of the detection electrode 234-1 to determine whether the corresponding one earphone 100 is received in the charging case; and the second detection sub-circuit 231432 detects the change in the voltage level of the detection electrode 234-2 to determine whether the other corresponding one earphone 100 is received in the charging case.

The first detection sub-circuit 231431 includes a resistor R1, a diode D1, and a capacitor C1. An end of the resistor R1 is connected to the first microprocessor 2314 and an end of the capacitor C1. The other end of the capacitor C1 is grounded. The other end of the resistor R1 is connected to the connection end of the detection electrode 234-1 and an end of the diode D1. The other end of the diode D1 is grounded.

The second detection sub-circuit 231432 includes a resistor R2, a diode D2, and a capacitor C2. An end of the resistor R2 is connected to the first microprocessor 2314 and an end of the capacitor C2. The other end of the resistor R2 is connected to the connection end of the detection electrode 234-2 and an end of the diode D2. The other end of the capacitor C2 is connected to the other end of the diode D2, and the other end of the capacitor C2 and the other end of the diode D2 are further grounded.

In the present embodiment, the charging case 200 detects, through the detection circuit 23143, the change in the voltage level of the electrode 234 to determine whether the earphones 100 are received in the charging case. In this way, an additional complex detection component or circuit is not required, the circuit structure of the charging case 200 is simplified, and the production cost is reduced.

When the charging case 200 determines that the earphones 100 have been received in the charging case 200 based on the detection signal generated by the detection circuit 23143, the charging case 200 charges the earphones 100 through the charging circuit 2315.

Figure 18:
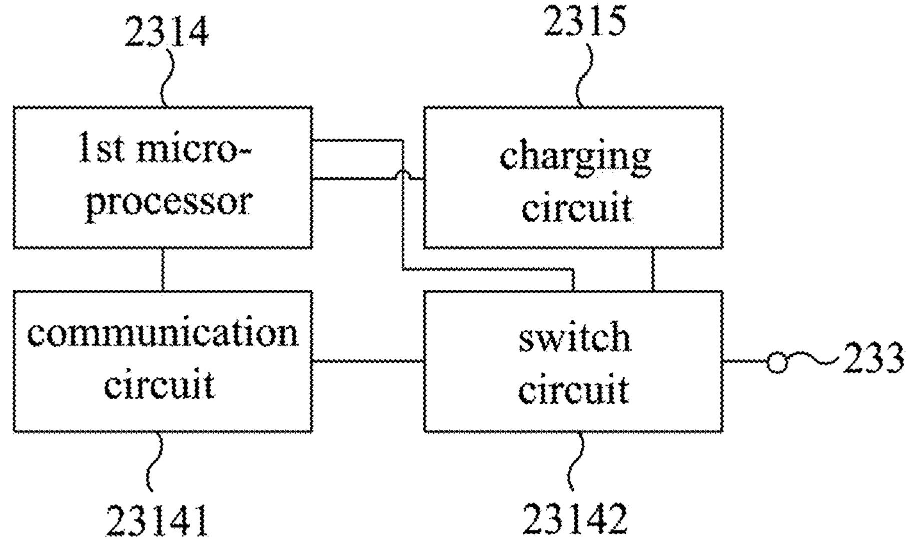
FIG. 18 is a third circuit diagram of the charging case according to an embodiment of the present disclosure.

As shown in FIG. 16 and FIG. 18, FIG. 18 is a third circuit diagram of the charging case according to an embodiment of the present disclosure. As shown in FIG. 18, the charging case 200 further includes a switch circuit 23142 and a communication circuit 23141 arranged on the circuit board 230.

The switch circuit 23142 is connected to the charging circuit 2315, the first power supply electrode 233, and the first microprocessor 2314. The communication circuit 23141 is connected to the first microprocessor 2314 and the switch circuit 23142. In some embodiments, the communication circuit 23141 may be a circuit that is independently arranged on the circuit board 230 or may be integrated into the first microprocessor 2314.

Specifically, the first microprocessor 2314 controls the switch circuit 23142 to allow the charging circuit 2315 and the first power supply electrode 233 to be conducted with or disconnected from each other intermittently. When the charging circuit 2315 is disconnected from the first power supply electrode 233, the first microprocessor 2314 controls the communication circuit 23141 to communicate with the earphones 100 through the first power supply electrode 233 to send a power level query signal to the earphones 100.

In some embodiments, a frequency at which the charging circuit 2315 and the first power supply electrode 233 are conducted with and disconnected from each other intermittently may be 5s-1. That is, in one cycle, a total time length during which the first microprocessor 2314 controls the charging circuit 2315 to charge the earphone 100 and controls the communication circuit 23141 to communicate with the earphones 100 is 200 ms.

In one cycle, while the first microprocessor 2314 controls the charging circuit 2315 to complete the charging of the earphones 100 for a predetermined period of time, the first microprocessor 2314 disconnects the charging circuit 2315 and controls the communication circuit 23141 to communicate with the earphones 100 for another predetermined period of time. In one cycle, the predetermined period of time for charging the earphones 100 may be 195 ms, and the another predetermined period of time for communication may be 5 ms. The exact time length is not limited herein.

When the battery power level of the earphone fed back from the earphone 100 reaches a predetermined power level threshold, the first microprocessor 2314 further controls the charging circuit 2315 to be disconnected from the first power supply electrode 233 and controls the communication circuit 23141 to send a shutdown signal to the earphone 100 through the first power supply electrode 233.

Specifically, the first microprocessor 2314 controls the communication circuit 23141 to send the in-case state signal, the power level query signal, and the shutdown signal to the second microprocessor 112 of the earphone 100. The second microprocessor 112 sends information about a remaining battery power level of the earphone 100 to the charging case 200 in based on the in-case state signal and the power level query signal, and shuts down the earphone based on the shutdown signal.

In some embodiments, the earphone 100 further includes a first detection circuit. The first detection circuit is configured to detect the in-case state of the earphones 100 and generate a first in-case state information based on the in-case state of the earphones 100. The second microprocessor 112 receives the in-case state signal generated by the detection circuit 23143 and/or the first in-case state information generated by the first detection circuit to determine that the earphones 100 is received in the charging case 200.

When the second microprocessor 112 receives the in-case state signal, the second microprocessor 112 determines that the earphones 100 are received in the charging case 200. When the second microprocessor 112 does not receive the in-case state signal and receives the first in-case state information, the second microprocessor 112 determines that the earphones 100 are received in the charging case 200 and the charging case 200 is malfunctioned, and generates a malfunction reminding signal.

Figure 19:
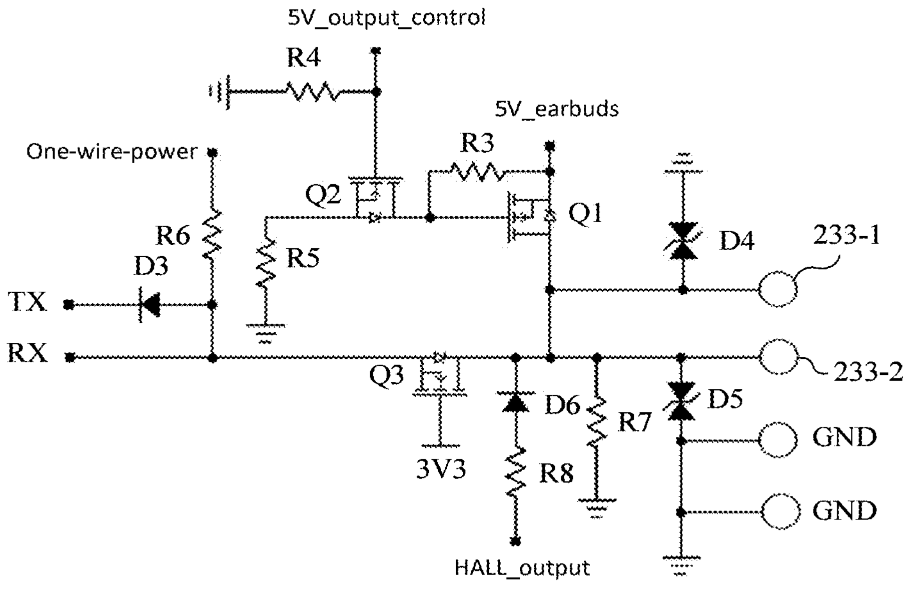
FIG. 19 is a circuit diagram of a switch circuit in FIG. 18, according to an embodiment of the present disclosure.

As shown in FIG. 18 and FIG. 19, FIG. 19 is a circuit diagram of the switch circuit in FIG. 18, according to an embodiment of the present disclosure. As shown in FIG. 19, the switch circuit 23142 includes a PMOS transistor Q1, an NMOS transistor Q2, a resistor R3, a resistor R4, a resistor R5, a resistor R6, and a diode D3.

A source of the PMOS transistor Q1 is connected to the charging circuit 2315 an end of the resistor R3 to receive an output signal 5V_earbuds sent from the charging circuit 2315. A drain of the PMOS transistor Q1 is connected to a connection end of the first power supply electrode 233, and specifically, connected to the first power supply electrode 233-1 and the first power supply electrode 233-2, which are the two first power supply electrodes 233 of the two earphones 100 abutting against the second power-receiving electrodes 142. A gate of the PMOS transistor Q1 is connected to a drain of the NMOS transistor Q2 and the other end of the resistor R3. A source of the NMOS transistor Q2 is connected to an end of the resistor R5, and the other end of the resistor R5 is grounded. A gate of the NMOS transistor Q2 is connected to the first microprocessor 2314 and an end of the resistor R4 to receive a control signal 5V_ output_control output from the first microprocessor 2314. The other end of resistor R4 is grounded.

An end of the resistor R6 is connected to the first microprocessor 2314 to receive a pull-up voltage One_wire_power output from the first microprocessor 2314. The other end of the resistor R6 is connected to a positive pole of the diode D3 and a data receiving end RX of the communication circuit 23141. A negative pole of the diode D3 is connected to a data transmitting end TX of the communication circuit 23141.

The charging case 200 further includes an anti-backflow member Q3. The anti-backflow member Q3 is arranged between the communication circuit 23141 and the connection end of the switch circuit 23142 and the first power supply electrode 233 to prevent a charging current of the charging circuit from flowing backward to the communication circuit 23141.

Specifically, a source of the anti-backflow member Q3 is connected to the other end of the resistor R6. A drain of the anti-backflow member Q3 is connected to the connection end of the first power supply electrode 233, specifically, connected to the first power supply electrode 233-1 and the first power supply electrode 233-2. A gate of the anti-backflow member Q3 is connected to a reference voltage 3.3 V output from the first microprocessor 2314.

Further, the switch circuit 23142 further includes a resistor R7, a diode D4, and a diode D5. The resistor R7 is configured to prevent the circuit from being short circuited. The diode D4 and the diode D5 are configured to prevent static electricity. An end of the resistor R7 is connected to the drain of the anti-backflow member Q3 and an end of the diode D5. The other end of the resistor R7 and the other end of the diode D5 are grounded. An end of the diode D4 is connected to the drain of the PMOS transistor Q1, and the other end of the diode D4 is grounded.

In the present embodiment, the switch circuit 23142 receives the control signal 5V_output_control output from the first microprocessor 2314 to control the PMOS transistor Q1 to be conducted or disconnected. In this way, time-sharing multiplexing of charging and communication can be achieved, and the circuit is simplified.

Figure 21:
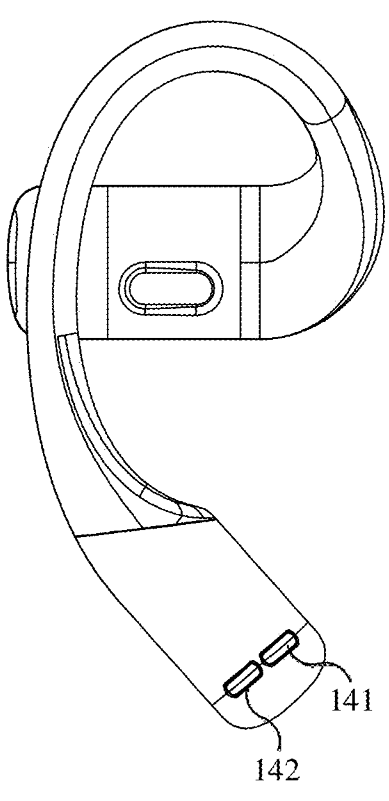
FIG. 21 is a second structural schematic view of the earphones shown in FIG. 1, according to an embodiment of the present disclosure.

In some embodiments, as shown in FIG. 20 and FIG. 21, FIG. 21 is a second structural schematic view of the earphones shown in FIG. 1, according to an embodiment of the present disclosure. As shown in FIG. 20, the earphone 100 includes the body portion 110, the battery portion 120, and the elastic connection portion 130. The elastic connection portion 130 is configured to connect the body portion 110 to the battery portion 120. As shown in FIG. 21, when the earphone 100 is worn to the ear, the side of the battery portion 120 of the earphone 100 near the ear is arranged with the first power-receiving electrode 141 and the second power-receiving electrode 142. The first power-receiving electrode 141 is spaced apart from the second power-receiving electrode 142.

Specifically, the first power-receiving electrode 141 and the second power-receiving electrode 142 are disposed at an end of the battery portion 120 of the earphone 100 away from the elastic connection portion 130 of the earphone 100. A length direction of the first power-receiving electrode 141 and the second power-receiving electrode 142 is parallel to a circumferential direction of the battery portion 120. The first power-receiving electrode 141 and the second power-receiving electrode 142 are arranged in a same plane parallel to the circumferential direction. In some embodiments, each of the first power-receiving electrode 141 and the second power-receiving electrode 142 is a strip-shaped electrode, and the first power-receiving electrode 141 and the second power-receiving electrode 142 have a same size.

Figure 10:
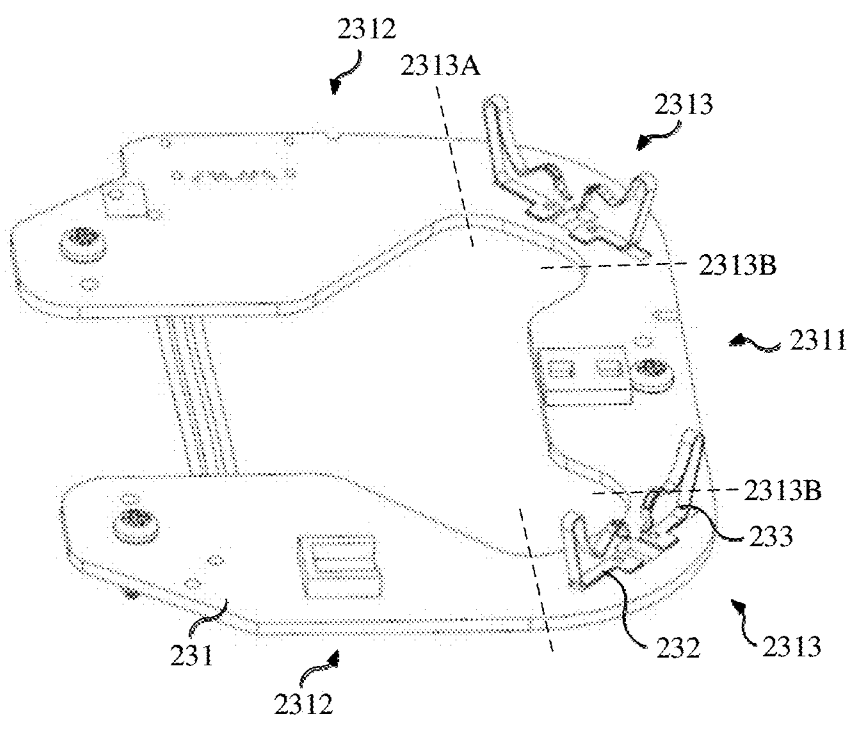
FIG. 10 is a second structural schematic view of the circuit board shown in FIG. 2, according to an embodiment of the present disclosure.

As shown in FIG. 1, FIG. 2, FIGS. 5-8, FIG. 20, FIG. 4, FIG. 10, and FIG. 11, FIG. 4 is a second structural schematic view of the support plate shown in FIG. 2, according to an embodiment of the present disclosure; FIG. 10 is a second structural schematic view of the circuit board shown in FIG. 2, according to an embodiment of the present disclosure; and FIG. 11 is a structural schematic view of the support plate shown in FIG. 2 being assembled with the circuit board shown in FIG. 2, according to an embodiment of the present disclosure. In the present embodiment, as shown in FIG. 11, the side of the circuit board 230 near the support plate 212 is arranged with the second power supply electrode 232 and the first power supply electrode 233. As shown in FIG. 10 and FIG. 11, the circuit board 230 includes the first circuit region 2311, the second circuit region 2312, and the connection region 2313.

The connection region 2313 is substantially ring-shaped. The connection region 2313 corresponds to the arc transition portion disposed between the second side edge 21212 and the third side edge 21213 of the support plate 212 or corresponds to the arc transition portion disposed between the second side edge 21212 and the fourth side edge 21214 of the support plate 212. Two ends of the connection region 2313 are connected to the first circuit region 2311 and the second circuit region 2312, respectively. The first power supply electrode 233 and the second power supply electrode 232 are arranged in the connection region 2313.

Two sets of the second circuit regions 2312 and the connection regions 2313 are arranged. In the direction of the spacing between the third side edge 21213 and the fourth side edge 21214, one set of the second circuit region 2312 and the connection region 2313 is connected to one of the two ends of the first circuit region 2311; and the other one set of the second circuit region 2312 and the connection region 2313 is connected to the other one of the two ends of the first circuit region 2311. In this way, the circuit board 230 is U-shaped in overall. The circuit board 230 is symmetrical about the centerline of the first circuit region 2311. Two first power supply electrodes 232, which are respectively disposed in the two sets of the connection regions 2312, and two second power supply electrodes 233, which are respectively disposed in the two sets of connection regions 2313, are symmetrically disposed about the centerline of the first circuit region 2311.

In the present embodiment, each of the first power supply electrode 233 and the detection electrode 234 is the resilient electrode. The first power supply electrodes 232 and the second power supply electrode 233 are disposed opposite to each other in a V-shape. Specifically, a surface of the first power supply electrodes 232 opposite to the second power supply electrode 233 and a surface of the second power supply electrode 233 opposite to the first power supply electrodes 232 form a substantially V-shaped structure. The first power supply electrode 232 and the second power supply electrode 233, which are disposed opposite to each other in the V-shape, can better support and fix the battery portion 120 of the earphone 100. In this way, the first power-receiving electrode 141 is prevented from being electrically disconnected, caused by movement of the earphone 100, from the first power supply electrode 232, and the second power-receiving electrode 142 is prevented from being electrically disconnected, caused by movement of the earphone 100, from the second power supply electrode 233.

In some embodiments, the first power supply electrode 232 is the charging positive electrode and the second power supply electrode 233 is the charging negative electrode. Alternatively, the first power supply electrode 232 is the charging negative electrode and the second power supply electrode 233 is the charging positive electrode.

Figure 12:
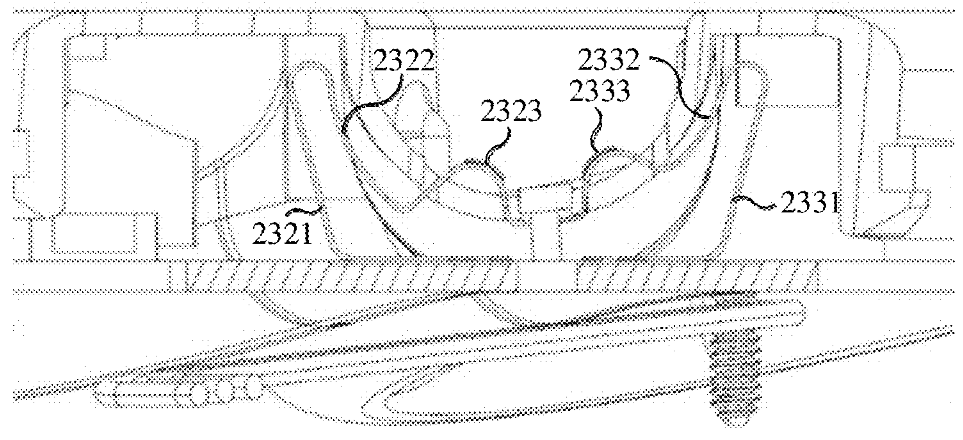
FIG. 12 is a first cross-sectional view of the support plate shown in FIG. 11, taken along a line II-II.
Figure 13:
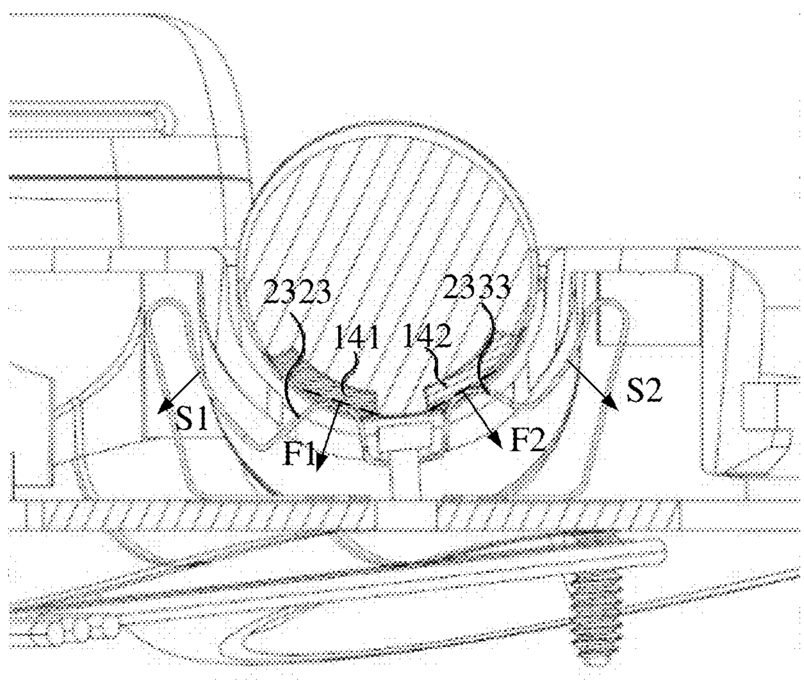
FIG. 13 is a second cross-sectional view of the support plate shown in FIG. 11, taken along a line II-II.

Further, as shown in FIGS. 12-13, FIG. 12 is a first cross-sectional view of the support plate shown in FIG. 11, taken along a line II-II; and FIG. 13 is a second cross-sectional view of the support plate shown in FIG. 11, taken along a line II-II. As shown in FIG. 12, the first power supply electrode 232 includes a first support portion 2321, a first abutting portion 2323, and a first connection portion 2322 connecting the first support portion 2321 to the first abutting portion 2323. The second power supply electrode 233 includes a second support portion 2331, a second abutting portion 2333, and a second connection portion 2332 connecting the second support portion 2331 to the second abutting portion 2333.

The first support portion 2321 is fixed to the circuit board 230 to arrange the first power supply electrode 232 on the circuit board 230. The first abutting portion 2323 is exposed from the through hole 21243 to abut against the first power-receiving electrode 141. In some embodiments, the first abutting portion 2323 is arc or circular-arc. The first support portion 2321 is substantially L-shaped. An end of the first support portion 2321 is fixed to the circuit board 230, and the other end of the first support portion 2321 is connected to the first connection portion 2322. An end of the first connection portion 2322 is connected to the other end of the first support portion 2321, and an arc section is formed. The first connection portion 2322 extends in from the arc section towards the first abutting portion 2323 and is arranged along a side wall of the support plate 212 away from the second shape-matching region 2132 to form a first cantilever.

As shown in FIG. 12, when the earphone 100 is received in the charging case 200, and the earphone 100 applies a force to the second power supply electrode 233 to deform the second power supply electrode 233. Specifically, the second abutting portion 2333 is arc or circular-arc. The earphone 100 is connected to the second abutting portion 2333 and applies a force F2 in a direction perpendicular to a tangent line of a point at which the earphone 100 is connected to the second abutting portion 2333. On the other hand, since the second connection portion 2332 forms a second cantilever, a direction in which the first power supply electrode 232 is most likely to be deformed is a direction perpendicular to an extending direction of the second cantilever, i.e., the S2 direction in FIG. 11. The expression of "most likely to be deformed" refers to a force, which is required to generate a same amount of deformation, being minimized.

As shown in FIG. 12, an actual direction F2 in which the force is applied to the second power supply electrode 233 is substantially parallel to the direction S2 in which the second power supply electrode 233 is most likely to be deformed. In this way, a reaction force that is applied by the second power supply electrode 233 to the earphone 100 is reduced, such that the second power supply electrode 233 may be easily pressed down, and the earphone 100 can be received into the charging case 200 easily.

Specifically, a second angle between the actual direction F2 in which the force is applied to the second power supply electrode 233 and the direction S2 perpendicular to the extending direction of the second cantilever is within a threshold range. The threshold range may be 0°-45°. In other embodiments, the threshold range may be 0°-30°, 0°-15°, or 10°-45°, and the like.

Specifically, the circuit board 230 is further arranged with the charging circuit (not shown). The charging circuit is connected to the first power supply electrode 232 and the second power supply electrode 233. When the earphone 100 is received in the shape-matching groove 213, the first power-receiving electrode 141 abuts against the first power supply electrode 232, and the second power-receiving electrode 142 abuts against the second power supply electrode 233, such that the charging circuit charges the earphone 100 received in the charging case 200 through the charging circuit formed by the second power supply electrode 232 and the first power supply electrode 233.

Further, as shown in FIG. 23, FIG. 23 is a fourth structural schematic view of the earphones shown in FIG. 1, according to an embodiment of the present disclosure. As shown in FIG. 23, the body portion 110 and the battery portion 120 of the earphone 100 are not disposed on a same plane. When the earphone 100 is received in the shape-matching groove 213, the body portion 110 and a portion of the elastic connection portion 130 connecting to the body portion 110 surrounds the tab 21241 to allow the earphone 100 to fit with the shape-matching groove 213.

Figure 4:
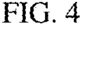
FIG. 4 is a second structural schematic view of the support plate shown in FIG. 2, according to an embodiment of the present disclosure.

As shown in FIG. 4, the charging case 200 further includes a limiting structure 2129. The limiting structure 2129 is received in the shape-matching groove 213 to limit the earphone 100 received in the shape-matching groove 213.

Specifically, a set of limiting structures 2129 are received in each shape-matching groove 213. The set of limiting structures 2129 includes one first limiting structure 2129A and one second limiting structure 2129B. The first limiting structure 2129A and the second limiting structure 2129B are opposite to each other. The first limiting structure 2129A is arranged on a side wall of the second shape-matching region 2132. The second limiting structure 2129B is arranged on a side wall of the third shape-matching region 2132.

The earphone 100 is received in the charging case 200. The first limiting structure 2129A and the second limiting structure 2129B respectively abut against two sides of the battery portion 120 and/or the elastic connection portion 130 of the earphone 100 to limit the earphone 100.

Figure 14:
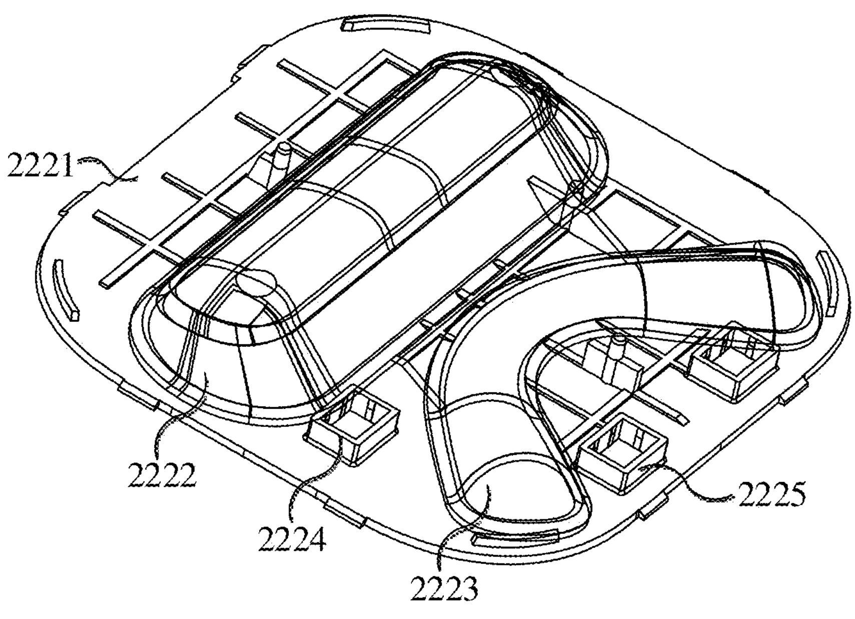
FIG. 14 is a structural schematic view of a fourth housing shown in FIG. 2, according to an embodiment of the present disclosure.

For the above two embodiments, as shown in FIG. 2, the second housing assembly 220 further includes a third housing 221 and a fourth housing 222. The third housing 221 sleeves an outside of the fourth housing 222, and the third housing 221 and the fourth housing 222 cooperatively form the second housing assembly 220. As shown in FIG. 2 and FIG. 14, FIG. 14 is a structural schematic view of the fourth housing shown in FIG. 2, according to an embodiment of the present disclosure. As shown in FIG. 14, the fourth housing 222 includes a main board 2221, a first receiving slot 2222, and a second receiving slot 2223. The first receiving slot 2222 and the second receiving slot 2223 are defined in a side of the main board 2221 away from the third housing 221. A projection of the first receiving slot 2222 onto the support plate 212 coincides with the first shape-matching region 2131 and a portion of the third shape-matching region 2133. A projection of the second receiving slot 2223 onto the support plate 212 coincides with the second shape-matching region 2132 and a portion of the third shape-matching region 2133.

When the earphone 100 is received in the shape-matching groove 213 and the second housing assembly 220 covers the first housing assembly 210, a portion of the body portion 110 of the earphone 100 that is exposed from the shape-matching groove 213 abuts against a wall of the first receiving slot 2222. A portion of the battery portion 120 of the earphone 100 that is exposed from the shape-matching groove 213 abuts against a wall of the second receiving slot 2223. In this way, the earphone 100 is fixed.

As shown in FIG. 14, a side of the main plate 2221 near the third housing 221 further defines a mounting slot 2224 in which a first Hall sensor (not shown) is mounted. As shown in FIG. 5, a side of the support plate 212 away from the shape-matching groove 213 defines a mounting slot 2126 in which a second Hall sensor (not shown) is mounted. As shown in FIG. 16, the charging case 200 further includes the Hall sensor 2316 that is electrically connected to the first microprocessor 2314. The Hall sensor is formed by the first Hall sensor and the second Hall sensor.

Specifically, when the charging case 200 is opened or closed, a distance between the first Hall sensor and the second Hall sensor changes, and an increasing edge signal or a falling edge signal is generated. The increasing edge signal or the falling edge signal is transmitted to the first microprocessor 2314 to inform the first microprocessor 2314 that the charging case 200 is opened or closed. S As shown in FIG. 16, the charging case 200 further includes an LED 2317 arranged on the circuit board 230. The LED 2317 is connected to the first microprocessor 2314. As shown in FIG. 9, the side of the circuit board 230 near the support plate 212 is further arranged with a first light guiding post 236 and a second light guiding post 237.

The first housing assembly 210 and the second housing assembly 220 further form an outer housing of the charging case 200. The charging case 200 further includes an earphone power level indicator 2128 and a charging case power indicator 2115. The earphone power level indicator 2128 is disposed in an interior of the outer housing. The charging case power indicator 2115 is visible from an exterior of the outer housing. The earphone power level indicator 2128 is configured to display information of the earphones 100 received in the charging case 200. The charging case power indicator 2115 is configured to display information of the charging case 200 itself.

As shown in FIGS. 3 and 4, the support plate 212 is arranged with the earphone power level indicator 2128. Specifically, the earphone power level indicator 2128 is arranged in the first flat region 2122 and is visible when the second housing assembly 220 is open with respect to the first housing assembly 210. The first light guiding post 236 is configured to direct light emitted by the LED 2317 to the earphone power level indicator 2128 to enable the earphone power level indicator 2128 to display different color to indicate corresponding information of the earphone 100. Specifically, the information of the earphone 100 includes the battery power level of the earphone 100 and pairing of the earphone 100.

The first microprocessor 2314 further selects a relatively lower battery power level from two battery power levels fed back by the two earphones 100 and controls the earphone power level indicator 2128 to display a corresponding color of light based on the selected battery power level.

As shown in FIG. 8, the case body 211 is further arranged with the charging case power indicator 2115. The second light guiding post 237 is configured to direct the light emitted by the LED 2317 to the charging case power indicator 2115 to enable the charging case power indicator 2115 to display different colors to indicate corresponding information of the charging case 200. The information of the charging case 200 includes the battery power level of the charging case 200.

In the present embodiment, five sets of LEDs 2317 are arranged, including a first LED, a second LED, a third LED, a fourth LED, and a fifth LED. The first LED generates green light. The second LED generates green light. The third LED generates orange light. The fourth LED generates orange light. The fifth LED generates white light. The first LED, the third LED, and the fifth LED are configured to display information of the earphone 100. The second LED and the fourth LED are configured to display information of the charging case 200.

The first microprocessor 2314 controls the first LED, the third LED, or the fifth LED to generate the corresponding green light, the orange light, or the white light based on the battery power level which is obtained by the first microprocessor 2314 sending the power level query information to the earphone 100 through the communication circuit 23141.

The first microprocessor 2314 controls the third LED to normally emit light when the lowest power level of the two earphones 100 is less than 30%. The first microprocessor 2314 controls the first LED to normally emit light when the lowest power level is greater than 30%. Specifically, the first microprocessor 2314 controls the first LED or the third LED to normally emit light for 5 seconds based on the battery power level of the detected earphone 100. When the two earphones 100 are both in the charging case 200 and keys on the two earphones 100 are long-pressed for 3 seconds, the earphones 100 enter a pairing state. In this case, the first microprocessor 2314 controls the fifth LED to flash for 3 minutes. When the pairing is successful within the 3 minutes, the first microprocessor 2314 controls the fifth LED to normally emit light. Specifically, the fifth LED normally emits light for 5 seconds. When the pairing fails within the 3 minutes, the first microprocessor 2314 controls the fifth LED to be lit off.

The first microprocessor 2314 obtains the remaining power level of the charging case 200 by detecting a power level of the battery 240. When the first microprocessor 2314 detects that the power level of the battery 240 is greater than 40%, the first microprocessor 2314 controls the second LED to emit light. When the first microprocessor 2314 detects that the power level of the battery 240 is less than 40%, the first microprocessor 2314 controls the fourth LED to emit light. Specifically, the first microprocessor 2314 controls the second LED or the fourth LED to continuously emit light for 5 seconds based the power level of the detected battery 240.

As shown in FIG. 9, the side of the circuit board 230 near the support plate 212 is further arranged with a charging port 235. As shown in FIG. 8, the case body 211 further defines a through hole 2112. When the circuit board 230 is received in the receiving space 214, the charging port 235 is snapped into the through hole 2112 to enable the charging port 235 to be exposed out of the case body 211.

The charging case 200 is connected to an external power source via the charging port 235 to charge the charging case 200. Specifically, the charging port 235 is connected to the charging circuit 2315 to further charge the battery 240 via the charging circuit 2315.

In the present embodiment, the charging circuit 2315 may specifically be a charging management chip having a buck charging function and a boost discharging function. When the charging case 200 is charged via the charging port 235, the charging circuit 2315 takes the buck charging function to receive an input voltage to charge the battery 240. When the charging case 200 charges the earphones 100, the charging circuit 2315 takes the boost discharge function to increase a voltage output from the battery 240 to a charging voltage for the earphones 100 to charge the earphones 100.

In other embodiments, the charging circuit 2315 may specifically include a buck charging circuit a boost discharging circuit. The charging case 200 and the earphones 100 are charged through the corresponding circuit.

As shown in FIG. 8, the bottom wall of the case body 211 is arranged with a plurality of positioning blocks 2119. Specifically, each positioning block 2119 is a right-angled block. Four positioning blocks 2119 are symmetrically disposed with each other to form a rectangular structure to arrange and fix the battery 240.

As shown in FIG. 8, the bottom wall of the case body 211 further defines a first mounting hole 2117, a second mounting hole 2116, and a third mounting hole 2118. A projection of the first mounting hole 2117 onto the bottom wall of the case body 211 and a projection of the second mounting hole 2116 onto the bottom wall of the case body 211 are located near a projection of the first side edge 21211 of the support plate 212 onto the bottom wall of the case body 211. A projection of the third mounting hole 2118 onto the bottom wall of the case body 211 is located near the projection of the second side edge 21212 of the support plate 212 onto the bottom wall of the case body 211.

As shown in FIG. 9, the side of the circuit board 230 near the support plate 212 further defines a first screw hole 2381, a second screw hole 2382, and a third screw hole 2383. The first screw hole 2381 and the second screw hole 2382 are defined in the second circuit region 2312 and are located near the first charging electrode 232. The third screw hole 2383 is defined in the first circuit region 2311 and coincides with a projection of the second light guiding post 237 onto the circuit board 230.

After placing the battery 240 in the receiving space 214, the circuit board 230 is further arranged on the battery 240. Further, a screw is arranged extending through the first mounting hole 2117 and the first screw hole 2381, another screw is arranged extending through the second mounting hole 2116 and the first screw hole 2382, and still another screw is arranged extending through the third mounting hole 2118 and the first screw hole 2383. In this way, the circuit board 230 is fixedly received in the receiving space 214. Specifically, the side of the circuit board 230 away from the support plate 212 abuts against the battery 240 to further secure the battery 240.

Figure 15:
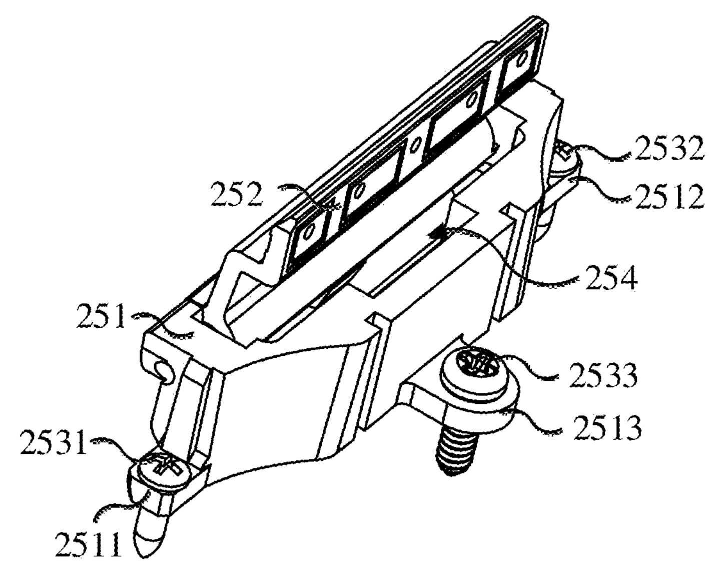
FIG. 15 is a structural schematic view of an adaptor assembly shown in FIG. 2, according to an embodiment of the present disclosure.

Specifically, in the present disclosure, the first housing assembly 210 and the second housing assembly 220 are rotatably connected to each other by an adapter assembly 250. As shown in FIG. 2 and FIG. 15, FIG. 15 is a structural schematic view of the adaptor assembly shown in FIG. 2, according to an embodiment of the present disclosure. As shown in FIG. 15, the adapter assembly 250 includes a connection main plate 251 and a rotating connection plate 252 that are rotatably connected to each other. A side of the connection main plate 251 near the support plate 212 defines a mounting groove 254. The rotating connection plate 252 is received in the mounting groove 254.

A first tab 2511 and a second tab 2512 are formed on two opposite sides of the connection main plate 251, respectively. A third tab 2513 is formed on a third side adjacent to the two sides. The first tab 2511 defines a first mounting hole (not shown). The second tab 2512 defines a second mounting hole (not shown). The third tab 2513 defines a third mounting hole (not shown).

As shown in FIG. 8, a side wall of the case body 211 near the first side edge 21211 of the support plate 212 defines an opening 2111. Further, the case body 211 further includes a mounting seat 2114 arranged on an inner wall of the side wall that defines the opening 2111. The mounting seat 2114 specifically includes a support seat and three screw holes.

When the first housing assembly 210 is assembled with the adapter assembly 250, the connection main plate 251 is disposed in the opening 2111. A first screw 2531 is arranged extending through the first mounting hole and the screw hole of the mounting seat 2114 for fixation. A second screw 2532 is arranged extending through the second mounting hole and the screw hole of the mounting seat 2114 for fixation. A third screw 2533 is arranged extending through the third mounting hole and the screw hole of the mounting seat 2114 for fixation.

When the second housing assembly 220 is assembled with the adapter assembly 250, the rotation connection plate 252 and the second housing assembly 220 may be connected and fixed to each other by arranging screws in screw holes, by arranging blind posts into blind holes, or by magnets.

The charging case 200 drives, through the rotation connection plate 252, the second housing assembly 220 to rotate, such that the second housing assembly 220 can be opened relative to the first housing assembly 210.

A rotation angle that the first housing assembly 210 can rotate relative to the second housing assembly 220 may range from 0° to 90°. When the second housing assembly 220 covers the first housing assembly 210, an angle between the second housing assembly 220 and the first housing assembly 210 is 0°. When the second housing assembly 220 is fully opened relative to the first housing assembly 210, an angle between the second housing assembly 220 and the first housing assembly 210 is 90°.

In some embodiments, when an angle between the rotation connection plate 252 and a plane of the connection main plate 251 parallel to the support plate 212 is greater than a predetermined angle, the rotation connection plate 252 drives the second housing assembly 220 to move autonomously to be fully opened relative to the first housing assembly 210. The predetermined angle may be 45° or 30°, and so on.

As shown in FIG. 14, the side of the main plate 2221 near the third housing 221 further defines a magnet mounting slot 2225. The magnet mounting slot 2225 is located near a side of the main plate 2221 adjacent to the second side edge 21212 of the support plate 212. The predetermined is defined to receive a third magnet (not shown in the figure). As shown in FIG. 5, the side of the support plate 212 away from the shape-matching groove 213 further defines a magnet mounting slot 21253. The magnet mounting slot 21253 is defined near the second side edge 21212 for receiving a fourth magnet (not shown in the figure).

When the second housing assembly 220 covers the first housing assembly 210, the third magnet and the fourth magnet attract each other, enabling a relative position between the second housing assembly 220 and the first housing assembly 210 to be unchanged, even if the charging case 200 is always closed. In addition, reliability of the closure of the charging case 200 is improved.

Figure 24:
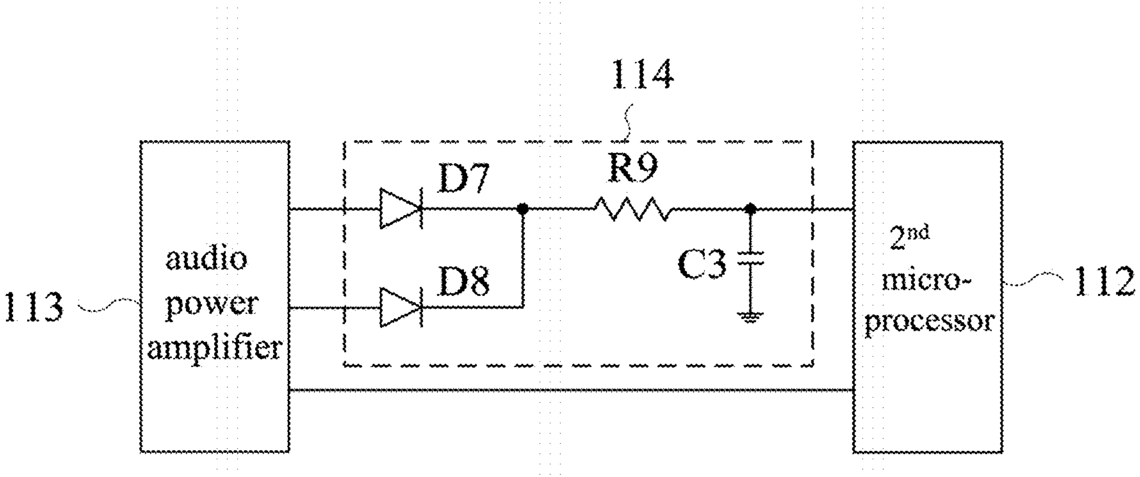
FIG. 24 is a circuit diagram of the earphones according to an embodiment of the present disclosure.

As shown in FIGS. 20-FIG. 24, FIG. 24 is a circuit diagram of the earphones according to an embodiment of the present disclosure. As shown in FIG. 24, the earphone 100 further includes an electrostatic protection circuit 114 and an audio power amplifier 113. The audio power amplifier 113 is connected to the second microprocessor 112. The electrostatic protection circuit 114 is connected to the audio power amplifier 113 and the second microprocessor 112. The electrostatic protection circuit 114 is configured to convert an AC signal output from the audio power amplifier 113 into a direct current (DC) signal. When a voltage of the DC signal is less than a threshold voltage, the second microprocessor 112 determines that the audio power amplifier 113 is working abnormally, and the second microprocessor 112 sends a reset signal to the audio power amplifier 113 to reset the audio power amplifier 113.

Specifically, since the second microprocessor 112 is connected to the electrostatic protection circuit 114 through an I/O port, pins of the I/O port divide the voltage input to the second microprocessor 112 to generate a divided voltage. The second microprocessor 112 detects a voltage value of the divided voltage and compares the detected voltage value to a threshold voltage to determine whether the output voltage from the electrostatic protection circuit 114 is abnormal, to further determine whether the audio power amplifier 113 works abnormally.

As shown in FIG. 24, the electrostatic protection circuit 114 includes a resistor R9, a capacitor C3, a diode D7, and a diode D8. The positive pole of the diode D7 is connected to a first output end of the audio power amplifier 113, a positive pole of the diode D8 is connected to a second output end of the audio power amplifier 113. The positive pole of the diode D7 and the positive pole of the diode D8 receive two alternating current (AC) signals output from the audio power amplifier 113. A negative pole of the diode D7 is connected to a negative pole of the diode D8 and an end of the resistor R9. The other end of the resistor R9 is connected to the I/O port of the second microprocessor 112 and an end of the capacitor C3. The other end of the capacitor C3 is grounded. The other end of the capacitor C3 and the other end of the resistor R9 form the output end of the electrostatic protection circuit 114.

In the present embodiment, the electrostatic protection circuit 114 is arranged between the audio power amplifier 113 and the second microprocessor 112. The second microprocessor 112 detects the voltage at the I/O pins connected to the output end of the electrostatic protection circuit 114 to detect the working state of the audio power amplifier 113. In this way, the circuit structure is simple.

The above describes only embodiments of the present disclosure and does not limit the scope of the present disclosure. Any equivalent structure or equivalent process transformation performed based on the contents of the specification and the accompanying drawings of the present disclosure, applied directly or indirectly in other related art, shall be similarly included in the scope of the present disclosure.

What is claimed is:

1. An earphone assembly, comprising:

at least one earphone and a charging case; wherein the charging case is configured to: charge the at least one earphone that are received in the charging case; and detect an in-case state of the at least one earphone that is received in the charging case; and for each earphone of the at least one earphone, the charging case comprises a first power supply electrode, a second power supply electrode, a first microprocessor, a charging circuit, a communication circuit, and a switch circuit; the charging circuit is connected to the second power supply electrode via the switch circuit to charge the earphone received in the charging case via a charging loop formed by the first power supply electrode and the second power supply electrode;

the first microprocessor controls the switch circuit to enable the charging circuit and the second power supply electrode to be conducted with or disconnected from each other intermittently; the first microprocessor is configured to control the communication circuit to communicate with the earphone via the second power supply electrode during a time period in which the charging circuit is disconnected from the second power supply electrode.

2. The earphone assembly according to claim 1, wherein, the charging case further comprises an anti-backflow member; the anti-backflow member is arranged between the communication circuit and a connection end of the switch circuit and the second power supply electrode and is configured to prevent a charging current of the charging loop from flowing backward to the communication circuit; and wherein the anti-backflow member is an N-Metal-Oxide-Semiconductor (NMOS) transistor, a source of the anti-backflow member is connected to the communication circuit, a drain of the anti-backflow member is connected to the connection end of the second power supply electrode, and a gate of the anti-backflow member is configured to receive a reference voltage.

3. The earphone assembly according to claim 2, wherein, the switch circuit comprises a P-Metal-Oxide-Semiconductor (PMOS) transistor, an NMOS transistor, a first resistor, a second resistor, and a third resistor;

a source of the PMOS transistor is connected to the charging circuit an end of the first resistor, a drain of the PMOS transistor is connected to the connection end of the second power supply electrode, a gate of the PMOS transistor is connected to the drain of the NMOS transistor and the other end of the first resistor, a source of the NMOS transistor is connected to an end of the second resistor, the other end of the second resistor is grounded, a gate of the NMOS transistor is connected to the first microprocessor and an end of the third resistor, the other end of the third resistor is grounded;

wherein, the switch circuit further comprises a diode and a fourth resistor; and an end of the fourth resistor is connected to the first microprocessor to receive a pull-up voltage output from the first microprocessor; the other end of the fourth resistor is connected to a positive pole of the diode, a data receiving end of the communication circuit, and a source of the anti-backflow member; and a negative pole of the diode is connected to a data transmitting end of the communication circuit.

4. The earphone assembly according to claim 1, wherein, in response to a battery power level of the earphone fed back from the earphone reaches a predetermined power level threshold, the first microprocessor is further configured to control the communication circuit to send a shutdown signal to the earphone through the power supply electrode.

5. The earphone assembly according to claim 1, wherein, the number of the at least one earphone is two; the charging case further comprises an earphone power level indicator;

the first microprocessor is configured to: select a relatively lower battery power level from two battery power levels fed back from the two earphones; and control the earphone power level indicator based on the selected battery power level; and wherein, the charging case further comprises an outer housing and a charging case power indicator; the outer housing further comprises: a first housing assembly and a second housing assembly pivotally connected to the first housing assembly; the charging case power indicator is configured to be visible from an exterior of the outer housing; the earphone power level indicator is disposed in an interior of the outer housing and is configured to be visible when the second housing assembly is open with respect to the first housing assembly.

6. The earphone assembly according to claim 1, wherein the earphone comprises a power-receiving electrode; the charging case further comprises a detection electrode and a detection circuit;

when the earphone is received in the charging case, the power-receiving electrode simultaneously abuts against the detection electrode and the first power supply electrode to allow the detection electrode to be short-circuited to the first power supply electrode; and wherein the detection circuit detects a change in a voltage level of the detection electrode to generate a detection signal corresponding to the in-case state of the earphone;

wherein, the earphone further comprises a second microprocessor, the second microprocessor is configured to control the communication circuit to send the in-box state and a power level query signal to the first microprocessor.

7. The earphone assembly according to claim 1, wherein, the charging case further comprises a detection electrode and a detection circuit; the first microprocessor detects, through the detection circuit, the in-case state of the earphone that is received in the charging case;

the earphone is arranged with a power-receiving electrode; when the earphone is received in the charging case, the power-receiving electrode simultaneously abuts against the detection electrode and the first power supply electrode to allow the detection electrode to be short-circuited to the first power supply electrode; the detection circuit is configured to detect a change in a voltage level of the detection electrode to generate an in-case state signal.

8. The earphone assembly according to claim 1, wherein the earphone comprises a battery portion, a body portion, an elastic connection portion, a first power-receiving electrode, and a second power-receiving electrode; the first power-receiving electrode and the second power-receiving electrode are disposed at an end of the battery portion and are spaced apart from each other; the elastic connection portion connects the body portion to the battery portion;

when the earphone is received in the charging case, the first power-receiving electrode abuts against the first power supply electrode, and the second power-receiving electrode abuts against the second power supply electrode.

9. The earphone assembly according to claim 8, wherein the charging case comprises a first housing assembly, the first housing assembly comprises a case body, a support plate, and a circuit board; an end of the case body has an opening, the support plate covers the end of the support plate having the opening, the circuit board is disposed between the support plate and the case body; the support plate defines a shape-matching groove for receiving the earphone, the first power supply electrode and the second power supply electrode are disposed on the circuit board; and a wall of the shape-matching groove defines two through holes, the first power supply electrode and the second power supply electrode are exposed from the two through holes respectively.

10. The earphone assembly according to claim 9, wherein the shape-matching comprises a first shape-matching region, a second shape-matching region, and a third shape-matching region; the first shape-matching region receives the body portion of the earphone, the second shape-matching region receives the battery portion of the earphone, the third shape-matching region connects the first shape-matching region to the second shape-matching region and receives the elastic connection portion of the earphone; the two through holes are defined in the second shape-matching region.

11. The earphone assembly according to claim 10, wherein the first power-receiving electrode and the second power-receiving electrode are disposed at an end of the battery portion of the earphone away from the elastic connection portion; a length direction of the first power-receiving electrode and the second power-receiving electrode is parallel to a circumferential direction of the battery portion; and the first power-receiving electrode and the second power-receiving electrode are disposed in a same plane parallel to the circumferential direction of the battery portion.

12. The earphone assembly according to claim 11, wherein the first power supply electrode comprises a first support portion, a first abutting portion, and a first connection portion connecting the first support portion to the first abutting portion; the first support portion is fixed to the circuit board, the first abutting portion is exposed from the through hole; and the first abutting portion is arc or circular arc.

13. The earphone assembly according to claim 12, wherein the first connection portion extends from an end of the first connection portion connecting to the first support portion towards the first abutting portion and is arranged along a side wall of the support plate away from the second shape-matching region, so as to form a first cantilever.

14. The earphone assembly according to claim 13, wherein the second power supply electrode comprises a second support portion, a second abutting portion, and a second connection portion connecting the second support portion to the second abutting portion; the second support portion is fixed to the circuit board, the second abutting portion is exposed from the through hole; and the second abutting portion is arc or circular arc.

15. The earphone assembly according to claim 14, wherein the second connection portion extends from an end of the second connection portion connecting to the second support portion towards the second abutting portion and is arranged along the side wall of the support plate away from the second shape-matching region, so as to form a second cantilever.

16. The earphone assembly according to claim 15, wherein each of the first power supply electrode and the second power supply electrode is a resilient electrode;

when the earphone is received in the charging case, the first power supply electrode is deformed, the second power supply electrode is deformed; a first angle between a direction in which a force is applied to the first power supply electrode and a direction perpendicular to an extending direction of the first cantilever is less than 45°; and a second angle between a direction in which a force is applied to the second power supply electrode and a direction perpendicular to an extending direction of the second cantilever is less than 45°.

17. The earphone assembly according to claim 1, wherein the earphone is arranged with a key and a second microprocessor, the key is configured to generate a key trigger signal in response to detecting a signal input by a user, the second microprocessor is configured to receive the key trigger signal;

the second microprocessor is configured to detect an in-case state signal; the second microprocessor is configured to determine that the earphone is received in the charging case in response to detecting the in-case state signal and to determine that the earphone is not received in the charging case in response to not detecting the in-case state signal;

the second microprocessor is configured to control the earphone to perform a first function in response to determining that the earphone is received in the charging case and in response to the key generating the key trigger signal; and the second microprocessor is configured to control the earphone to perform a second function in response to determining that the earphone is not received in the charging case and in response to the key generating the key trigger signal.

18. The earphone assembly according to claim 17, wherein the first function comprises at least one of: pairing the earphone with a communication device; or restoring the earphone to default settings; and the second function comprises at least one of: pausing or playing an audio, fast forwarding or fast rewinding an audio, and switching songs.

19. The earphone assembly according to claim 18, wherein the earphone further comprises an electrostatic protection circuit and an audio power amplifier, the audio power amplifier is connected to the second microprocessor, the electrostatic protection circuit is connected to the audio power amplifier and the second microprocessor, the electrostatic protection circuit is configured to convert an alternating current (AC) signal output from the audio power amplifier into a direct current (DC) signal;

when a voltage value of the DC signal is less than a threshold voltage, the second microprocessor determines that the audio power amplifier is working abnormally and sends a reset signal to the audio power amplifier to reset the audio power amplifier.

* * * * *